United States Patent
Suzuki et al.

(10) Patent No.: US 9,831,691 B2
(45) Date of Patent: Nov. 28, 2017

(54) POWER STORAGE SYSTEM AND CELL PROTECTION METHOD WHICH PROTECTS THE CELL BY BOTH CUTTING FROM THE CELL PACK AND THE CELL PACK FROM THE SYSTEM

(71) Applicant: NEC ENERGY DEVICES, LTD., Sagamihara-shi, Kanagawa (JP)

(72) Inventors: Shin Suzuki, Kanagawa (JP); Ryou Shiozaki, Kanagawa (JP)

(73) Assignee: NEC ENERGY DEVICES, LTD., Sagamihara-shi, Kanagawa (JP)

(*) Notice: Subject to any disclaimer, the term of this patent is extended or adjusted under 35 U.S.C. 154(b) by 297 days.

(21) Appl. No.: 14/425,218

(22) PCT Filed: Aug. 7, 2013

(86) PCT No.: PCT/JP2013/071300
§ 371 (c)(1),
(2) Date: Mar. 2, 2015

(87) PCT Pub. No.: WO2014/045745
PCT Pub. Date: Mar. 27, 2014

(65) Prior Publication Data
US 2015/0236535 A1      Aug. 20, 2015

(30) Foreign Application Priority Data
Sep. 18, 2012 (JP) ................................ 2012-204149

(51) Int. Cl.
*H02J 7/00*      (2006.01)
*H01M 10/42*      (2006.01)
*H01M 2/34*      (2006.01)

(52) U.S. Cl.
CPC ............. *H02J 7/0021* (2013.01); *H01M 2/34* (2013.01); *H01M 10/4257* (2013.01); *H02J 7/007* (2013.01); *H02J 7/0029* (2013.01)

(58) Field of Classification Search
CPC ........ H02J 7/0021; H02J 7/007; H02J 7/0029; H01M 10/4257; H01M 2/34
(Continued)

(56) References Cited

U.S. PATENT DOCUMENTS 4,493,001 A * 1/1985 Sheldrake ............... H02J 9/002
                                                         307/10.7
4,578,628 A * 3/1986 Siwiak ................... H02J 7/0045
                                                         320/112
(Continued)

FOREIGN PATENT DOCUMENTS

JP      09-331638 A      12/1997
JP      2002-175128 A    6/2002
(Continued)

OTHER PUBLICATIONS

International Search Report of PCT/JP2013/071300 dated Sep. 17, 2013 [PCT/ISA/210].

*Primary Examiner* — Robert Grant
*Assistant Examiner* — John Trischler
(74) *Attorney, Agent, or Firm* — Sughrue Mion, PLLC

(57) ABSTRACT

This power storage system is provided with a secondary cell pack and a system protection unit having a system protection function of cutting off the secondary cell pack from the outside of the power storage system. This secondary cell pack is provided with a secondary cell and a cell protection unit having a cell protection function of cutting off the secondary cell from the outside of the secondary cell pack. The cell protection unit further monitors a state value that indicates the state of the secondary cell and controls imple- (Continued)

mentation of the system protection function and the cell protection function on the basis of the state value.

8 Claims, 13 Drawing Sheets

(58) Field of Classification Search
USPC .................................................. 320/112
See application file for complete search history.

(56) References Cited

U.S. PATENT DOCUMENTS

| | | | | |
|---|---|---|---|---|
| 5,477,130 A * | 12/1995 | Hashimoto | ........ | G01R 31/3655 |
| | | | | 320/164 |
| 5,608,304 A * | 3/1997 | Okumura | ............ | H02J 7/0031 |
| | | | | 320/134 |
| 5,631,537 A * | 5/1997 | Armstrong | ............. | G05F 3/242 |
| | | | | 320/116 |
| 5,703,464 A * | 12/1997 | Karunasiri | ............ | B60L 3/0046 |
| | | | | 180/65.8 |
| 5,705,911 A * | 1/1998 | Tamai | ................... | H02J 7/0031 |
| | | | | 320/134 |
| 5,708,351 A * | 1/1998 | Takamoro | ............. | H02J 7/0065 |
| | | | | 307/150 |
| 5,764,033 A * | 6/1998 | Tamai | ................ | G01R 31/3648 |
| | | | | 320/132 |
| 5,789,900 A * | 8/1998 | Hasegawa | ............ | H01M 6/5011 |
| | | | | 320/132 |
| 5,804,944 A * | 9/1998 | Alberkrack | ............ | H02J 7/0011 |
| | | | | 320/163 |
| 5,828,202 A * | 10/1998 | Tamai | ................... | H02J 7/0029 |
| | | | | 320/134 |
| 5,898,294 A * | 4/1999 | Gold | ..................... | H01M 2/105 |
| | | | | 320/137 |
| 5,920,181 A * | 7/1999 | Alberkrack | ............ | H02J 7/0011 |
| | | | | 320/146 |
| 5,939,865 A * | 8/1999 | McGrath | ................ | H02J 7/0011 |
| | | | | 320/106 |
| 5,998,967 A * | 12/1999 | Umeki | .............. | H01M 10/4257 |
| | | | | 320/122 |
| 6,002,240 A * | 12/1999 | McMahan | ......... | H01M 10/4257 |
| | | | | 320/150 |
| 6,064,179 A * | 5/2000 | Ito | ..................... | G01R 19/16542 |
| | | | | 320/128 |
| 6,069,468 A * | 5/2000 | Sonobe | ............. | H01M 10/4257 |
| | | | | 320/106 |
| 6,144,186 A * | 11/2000 | Thandiwe | ......... | H01M 10/4257 |
| | | | | 320/134 |
| 6,208,117 B1 * | 3/2001 | Hibi | ...................... | H02J 7/0021 |
| | | | | 320/134 |
| 6,239,579 B1 * | 5/2001 | Dunn | ................. | G01R 31/3658 |
| | | | | 320/119 |
| 6,268,710 B1 * | 7/2001 | Koga | ................. | G01R 31/3624 |
| | | | | 320/116 |
| 6,326,766 B1 * | 12/2001 | Small | ................... | H01M 2/1055 |
| | | | | 320/112 |
| 6,329,792 B1 * | 12/2001 | Dunn | ................. | G01R 31/3658 |
| | | | | 320/130 |
| 6,331,763 B1 * | 12/2001 | Thomas | ................. | H02H 9/042 |
| | | | | 320/136 |
| 6,344,731 B2 * | 2/2002 | Park | ..................... | H02J 7/0047 |
| | | | | 320/132 |
| 6,420,852 B1 * | 7/2002 | Sato | .................... | H01M 10/425 |
| | | | | 320/134 |
| 6,433,514 B1 * | 8/2002 | McClure | ........... | H01M 10/4257 |
| | | | | 320/136 |
| 6,504,344 B1 * | 1/2003 | Adams | ................ | G01R 31/3658 |
| | | | | 320/132 |
| 6,507,173 B1 * | 1/2003 | Spiridon | ................ | H02J 7/027 |
| | | | | 320/137 |
| 6,518,729 B2 * | 2/2003 | Onishi | ................ | H02J 7/0029 |
| | | | | 320/134 |
| 6,518,731 B2 * | 2/2003 | Thomas | ................. | H02H 9/042 |
| | | | | 320/135 |
| 6,577,883 B1 * | 6/2003 | Ueda | ...................... | H01M 2/30 |
| | | | | 320/138 |
| 6,608,468 B2 * | 8/2003 | Nagase | ............... | G01R 31/3624 |
| | | | | 320/132 |
| 6,639,387 B2 * | 10/2003 | Kitagawa | ......... | G01R 19/16542 |
| | | | | 320/134 |
| 6,642,694 B2 * | 11/2003 | Yamanaka | ............ | H02J 7/0031 |
| | | | | 320/134 |
| 6,804,100 B2 * | 10/2004 | Astala | ................... | H02J 7/0029 |
| | | | | 320/134 |
| 6,850,039 B2 * | 2/2005 | Popescu | ............ | H01M 10/4257 |
| | | | | 320/134 |
| 6,914,416 B2 * | 7/2005 | Thomas | ................. | H02H 9/042 |
| | | | | 257/712 |
| 6,930,467 B2 * | 8/2005 | Suzuki | ................ | H01M 2/1016 |
| | | | | 320/134 |
| 6,956,356 B2 * | 10/2005 | Elder | ................ | H01M 10/4207 |
| | | | | 320/134 |
| 6,961,592 B2 * | 11/2005 | O'Connor | ......... | H01M 10/4257 |
| | | | | 320/134 |
| 7,002,265 B2 * | 2/2006 | Potega | ................... | B60L 11/185 |
| | | | | 307/149 |
| 7,019,493 B2 * | 3/2006 | Astala | ................... | H02J 7/0029 |
| | | | | 320/134 |
| 7,053,588 B2 * | 5/2006 | Nakanishi | ............. | H02J 7/0021 |
| | | | | 320/104 |
| 7,199,556 B1 * | 4/2007 | Benckenstein, Jr. . | | H02J 7/0016 |
| | | | | 320/112 |
| 7,304,453 B2 * | 12/2007 | Eaves | ................... | G01T 1/2018 |
| | | | | 320/107 |
| 7,318,978 B2 * | 1/2008 | Sakuma | ............... | H01M 2/0207 |
| | | | | 320/112 |
| 7,385,795 B2 * | 6/2008 | Denning | ................... | B25F 5/00 |
| | | | | 320/134 |
| 7,391,185 B2 * | 6/2008 | Tsubaki | .................. | H02H 7/18 |
| | | | | 320/150 |
| 7,435,506 B2 * | 10/2008 | Sakuma | ............... | H01M 2/0207 |
| | | | | 320/112 |
| 7,495,416 B2 * | 2/2009 | Sato | ...................... | H02J 7/0031 |
| | | | | 320/134 |
| 7,498,774 B2 * | 3/2009 | Ziegler | ............... | H01M 10/443 |
| | | | | 320/122 |
| 7,508,171 B2 * | 3/2009 | Carrier | ..................... | B25F 5/00 |
| | | | | 320/135 |
| 7,550,950 B2 * | 6/2009 | Tsubaki | .................. | H02H 7/18 |
| | | | | 320/150 |
| 7,553,583 B2 * | 6/2009 | Eaves | ................. | H01M 10/425 |
| | | | | 320/122 |
| 7,554,293 B2 * | 6/2009 | Horigome | ............. | H01M 10/42 |
| | | | | 320/107 |
| 7,570,017 B2 * | 8/2009 | Sainomoto | ............ | H02J 7/0031 |
| | | | | 320/112 |
| 7,579,811 B2 * | 8/2009 | Sato | ................... | H01M 10/4264 |
| | | | | 320/132 |
| 7,583,060 B2 * | 9/2009 | Kim | ......................... | H02H 7/18 |
| | | | | 320/134 |
| 7,602,146 B2 * | 10/2009 | Carrier | ..................... | B25F 5/00 |
| | | | | 320/116 |
| 7,605,565 B2 * | 10/2009 | Wozniak | ........... | H01M 10/4207 |
| | | | | 320/134 |
| 7,609,031 B2 * | 10/2009 | Benckenstein | ....... | H02J 7/0016 |
| | | | | 307/66 |
| 7,619,386 B2 * | 11/2009 | Sasaki | ................ | H01M 10/425 |
| | | | | 320/106 |
| 7,629,769 B2 * | 12/2009 | Gangstoe | ............ | H02J 7/0031 |
| | | | | 320/112 |
| 7,638,977 B2 * | 12/2009 | Park | .................... | H01M 10/482 |
| | | | | 320/134 |
| 7,659,692 B2 * | 2/2010 | Sainomoto | ............ | H02J 7/0026 |
| | | | | 320/112 |
| 7,675,269 B2 * | 3/2010 | Huang | .................... | H02H 7/18 |
| | | | | 320/118 |
| 7,679,331 B2 * | 3/2010 | Schulte | ................ | H02J 7/0029 |
| | | | | 320/134 |

(56) References Cited

U.S. PATENT DOCUMENTS

| | | | | |
|---|---|---|---|---|
| 7,683,575 | B2 * | 3/2010 | Berdichevsky | H01M 10/425 320/122 |
| 7,696,720 | B2 * | 4/2010 | Hasegawa | H01M 2/34 320/106 |
| 7,701,176 | B2 * | 4/2010 | Chen | H02J 7/0031 320/134 |
| 7,723,960 | B2 * | 5/2010 | Funabashi | H02J 7/0031 320/114 |
| 7,728,553 | B2 * | 6/2010 | Carrier | H01M 2/1022 320/116 |
| 7,737,658 | B2 * | 6/2010 | Sennami | H01M 2/1022 320/111 |
| 7,737,662 | B2 * | 6/2010 | Lu | H02J 7/0031 320/134 |
| 7,772,805 | B2 * | 8/2010 | Yamamoto | H01M 10/44 320/132 |
| 7,800,510 | B2 * | 9/2010 | Densham | H01M 10/4257 320/136 |
| 7,816,890 | B2 * | 10/2010 | Goto | H01M 2/34 320/134 |
| 7,830,120 | B2 * | 11/2010 | Ibrahim | H02J 7/0031 307/10.7 |
| 7,859,226 | B2 * | 12/2010 | Nakazawa | H01M 2/34 320/134 |
| 7,928,692 | B2 * | 4/2011 | Carrier | H01M 2/1022 320/116 |
| 7,944,662 | B2 * | 5/2011 | Carkner | H02J 7/0013 320/117 |
| 7,952,330 | B2 * | 5/2011 | Mori | H01M 2/34 320/144 |
| 7,977,916 | B2 * | 7/2011 | Hayakawa | H02J 7/0029 320/112 |
| 8,013,575 | B2 * | 9/2011 | Aradachi | H02J 7/0031 320/128 |
| 8,026,696 | B2 * | 9/2011 | Litingtun | H02J 7/0031 320/134 |
| 8,030,893 | B2 * | 10/2011 | Nakatsuji | H01M 10/441 320/116 |
| 8,093,863 | B2 * | 1/2012 | Carrier | H01M 2/1022 320/116 |
| 8,106,624 | B2 * | 1/2012 | Hayashi | H01M 10/4257 320/106 |
| 8,129,948 | B2 * | 3/2012 | Chen | H02J 7/0031 320/134 |
| 8,143,858 | B2 * | 3/2012 | Tsugawa | G01R 31/3631 320/134 |
| 8,163,411 | B2 * | 4/2012 | Mizoguchi | H01M 10/4207 320/116 |
| 8,174,811 | B2 * | 5/2012 | Hasunuma | H01M 2/34 320/150 |
| 8,183,835 | B2 * | 5/2012 | Takeda | H01M 2/34 320/112 |
| 8,183,836 | B2 * | 5/2012 | Funabashi | H02J 7/0031 320/134 |
| 8,193,774 | B2 * | 6/2012 | Takeda | H01M 2/34 320/128 |
| 8,212,523 | B2 * | 7/2012 | Tatebayashi | H02J 7/0016 320/116 |
| 8,212,529 | B2 * | 7/2012 | Yamamoto | H01M 2/34 320/134 |
| 8,269,458 | B2 * | 9/2012 | Cruise | H01M 10/425 320/112 |
| 8,283,893 | B2 * | 10/2012 | Lee | H02J 7/0031 320/134 |
| 8,299,758 | B2 * | 10/2012 | Sakaue | H02J 7/0021 320/134 |
| 8,344,687 | B2 * | 1/2013 | Nishikawa | H01M 10/42 320/106 |
| 8,358,108 | B2 * | 1/2013 | Seman, Jr. | H01M 2/1022 320/112 |
| 8,367,234 | B2 * | 2/2013 | Goto | H01M 10/48 320/134 |
| 8,415,922 | B2 * | 4/2013 | Funabashi | H02J 7/0026 320/114 |
| 8,415,927 | B2 * | 4/2013 | Wang | H02J 7/0031 320/134 |
| 8,436,590 | B2 * | 5/2013 | Funaba | B60K 6/445 307/109 |
| 8,487,586 | B2 * | 7/2013 | Kasai | H01M 2/1016 320/107 |
| 8,502,503 | B2 * | 8/2013 | Densham | H01M 10/42 320/116 |
| 8,508,192 | B2 * | 8/2013 | Matsuura | H02J 7/0021 320/132 |
| 8,531,157 | B2 * | 9/2013 | Maruyama | H01M 10/425 320/118 |
| 8,547,107 | B2 * | 10/2013 | Abe | H02J 7/0021 307/64 |
| 8,593,112 | B2 * | 11/2013 | An | H01M 10/42 320/134 |
| 8,618,805 | B2 * | 12/2013 | Li | H01M 10/441 320/149 |
| 8,648,572 | B2 * | 2/2014 | Kiyohara | H01M 10/44 320/134 |
| 8,649,138 | B2 * | 2/2014 | Nakashima | H02J 7/0021 320/134 |
| 8,659,270 | B2 * | 2/2014 | Hermann | H02J 7/0031 320/162 |
| 8,669,742 | B2 * | 3/2014 | Yun | H01M 2/34 320/134 |
| 8,674,657 | B2 * | 3/2014 | Kaino | H02J 7/0029 320/116 |
| 8,686,694 | B2 * | 4/2014 | Funaba | B60K 6/445 307/109 |
| 8,704,491 | B2 * | 4/2014 | Sugiura | H02J 7/0031 320/134 |
| 8,723,479 | B2 * | 5/2014 | Kim | H01M 10/46 320/112 |
| 8,736,229 | B2 * | 5/2014 | Kawahara | B60L 3/0046 320/116 |
| 8,749,091 | B2 * | 6/2014 | Skarani | G06F 1/263 307/10.1 |
| 8,773,830 | B2 * | 7/2014 | Ikeuchi | H01M 10/48 320/134 |
| 8,796,992 | B2 * | 8/2014 | Wu | H01M 10/44 320/117 |
| 8,796,996 | B2 * | 8/2014 | Nakatsuji | H01M 2/34 320/134 |
| 8,810,193 | B2 * | 8/2014 | Maruyama | H01M 10/425 320/107 |
| 8,847,552 | B2 * | 9/2014 | Ro | H01M 10/425 320/125 |
| 8,872,477 | B2 * | 10/2014 | Yang | H02J 7/0014 320/116 |
| 8,890,482 | B2 * | 11/2014 | Ikeuchi | H02J 7/0031 320/134 |
| 8,890,483 | B2 * | 11/2014 | Nakatsuji | H01M 2/34 320/134 |
| 8,890,536 | B2 * | 11/2014 | Park | H01M 2/206 320/116 |
| 8,896,270 | B2 * | 11/2014 | Tanaka | H02H 7/18 320/134 |
| 8,922,166 | B2 * | 12/2014 | White | H02J 7/0068 320/118 |
| 8,958,188 | B2 * | 2/2015 | Nakashima | H02J 7/0021 320/134 |
| 8,975,873 | B2 * | 3/2015 | Tanaka | H02J 7/0004 320/132 |
| 9,013,146 | B2 * | 4/2015 | Suzuki | H01M 10/4207 320/118 |
| 9,013,148 | B2 * | 4/2015 | Wu | H01M 10/44 320/117 |
| 9,018,915 | B2 * | 4/2015 | Nam | H02J 7/0031 320/135 |
| 9,035,620 | B2 * | 5/2015 | Kimura | H02J 7/0031 320/134 |
| 9,041,344 | B2 * | 5/2015 | Wu | H02J 7/0029 320/107 |

(56) References Cited

U.S. PATENT DOCUMENTS

| | | | | |
|---|---|---|---|---|
| 9,041,353 B2* | 5/2015 | Shi | G01R 31/3606 | 320/132 |
| 9,325,190 B2* | 4/2016 | Suzuki | H02J 7/0016 | |
| 9,425,608 B2* | 8/2016 | Kleczewski | H02H 3/202 | |
| 2001/0021092 A1* | 9/2001 | Astala | H02J 7/0029 | 361/90 |
| 2002/0036481 A1* | 3/2002 | Nagase | G01R 31/3624 | 320/132 |
| 2002/0050806 A1* | 5/2002 | Fujiwara | H02J 7/0031 | 320/136 |
| 2002/0070707 A1* | 6/2002 | Sato | H01M 10/425 | 320/134 |
| 2002/0079865 A1* | 6/2002 | Thomas | H02H 9/042 | 320/136 |
| 2002/0145406 A1* | 10/2002 | Onishi | H02J 7/0029 | 320/134 |
| 2002/0190693 A1* | 12/2002 | Kitagawa | G01R 19/16542 | 320/132 |
| 2003/0132732 A1* | 7/2003 | Thomas | H02H 9/042 | 320/134 |
| 2003/0227277 A1* | 12/2003 | Small | H01M 2/1055 | 320/112 |
| 2004/0101744 A1* | 5/2004 | Suzuki | H01M 2/1016 | 429/61 |
| 2004/0150368 A1* | 8/2004 | Horigome | H01M 10/42 | 320/132 |
| 2004/0201364 A1* | 10/2004 | Small | H01M 2/1055 | 320/112 |
| 2004/0217737 A1* | 11/2004 | Popescu | H01M 10/4257 | 320/128 |
| 2004/0251877 A1* | 12/2004 | Lee | H02J 7/0029 | 320/136 |
| 2005/0077878 A1* | 4/2005 | Carrier | B25F 5/00 | 320/134 |
| 2005/0127879 A1* | 6/2005 | Sato | H02J 7/0031 | 320/134 |
| 2005/0134227 A1* | 6/2005 | Wozniak | H01M 10/4207 | 320/134 |
| 2005/0134228 A1* | 6/2005 | Elder | H01M 10/4207 | 320/134 |
| 2005/0134230 A1* | 6/2005 | Sato | H01M 10/4264 | 320/136 |
| 2005/0156574 A1* | 7/2005 | Sato | H02H 7/18 | 320/134 |
| 2005/0168192 A1* | 8/2005 | Nagase | H02J 7/0047 | 320/132 |
| 2005/0258804 A1* | 11/2005 | Sakuma | H01M 2/0207 | 320/112 |
| 2005/0258805 A1* | 11/2005 | Thomas | H02H 9/042 | 320/134 |
| 2006/0012336 A1* | 1/2006 | Fujita | H02J 7/0021 | 320/119 |
| 2006/0082345 A1* | 4/2006 | Daniel-Ivad | H01M 10/4207 | 320/134 |
| 2006/0087280 A1* | 4/2006 | Miyashita | H01M 2/1072 | 320/104 |
| 2006/0087283 A1* | 4/2006 | Phillips | B25F 5/00 | 320/114 |
| 2006/0087284 A1* | 4/2006 | Phillips | B25F 5/00 | 320/114 |
| 2006/0087285 A1* | 4/2006 | Phillips | B25F 5/00 | 320/114 |
| 2006/0087286 A1* | 4/2006 | Phillips | B25F 5/00 | 320/114 |
| 2006/0091857 A1* | 5/2006 | Nakanishi | H02J 7/0021 | 320/116 |
| 2006/0119315 A1* | 6/2006 | Sasaki | H01M 10/425 | 320/106 |
| 2006/0139008 A1* | 6/2006 | Park | H01M 10/482 | 320/134 |
| 2006/0284598 A1* | 12/2006 | Xiong | H02J 7/0021 | 320/128 |
| 2007/0090800 A1* | 4/2007 | Schulte | H02J 7/0029 | 320/122 |
| 2007/0108940 A1* | 5/2007 | Sainomoto | H02J 7/0026 | 320/112 |
| 2007/0108941 A1* | 5/2007 | Sainomoto | H02J 7/0021 | 320/112 |
| 2007/0164709 A1* | 7/2007 | Tsubaki | H02H 7/18 | |
| 2007/0176578 A1* | 8/2007 | Tsugawa | G01R 31/3631 | 320/134 |
| 2008/0017408 A1* | 1/2008 | Morishita | H01L 21/563 | 174/260 |
| 2008/0084180 A1* | 4/2008 | Hasegawa | H01M 2/34 | 320/112 |
| 2008/0116851 A1* | 5/2008 | Mori | H01M 2/34 | 320/134 |
| 2008/0150488 A1* | 6/2008 | Lu | H02J 7/0031 | 320/134 |
| 2008/0180059 A1* | 7/2008 | Carrier | B25F 5/00 | 320/112 |
| 2008/0224662 A1* | 9/2008 | Hayakawa | H02J 7/0029 | 320/128 |
| 2008/0238370 A1* | 10/2008 | Carrier | H01M 2/1022 | 320/134 |
| 2008/0246441 A1* | 10/2008 | Tsubaki | H02H 7/18 | 320/150 |
| 2008/0278115 A1* | 11/2008 | Huggins | B60L 3/12 | 320/134 |
| 2008/0290833 A1* | 11/2008 | Hayashi | H01M 10/4257 | 320/106 |
| 2009/0021217 A1* | 1/2009 | Nakazawa | H01M 2/34 | 320/134 |
| 2009/0051324 A1* | 2/2009 | Nakatsuji | H01M 10/441 | 320/134 |
| 2009/0058368 A1* | 3/2009 | Seman, Jr. | H01M 2/1022 | 320/137 |
| 2009/0096419 A1* | 4/2009 | White | B60L 11/1861 | 320/118 |
| 2009/0121682 A1* | 5/2009 | Goto | H01M 2/34 | 320/134 |
| 2009/0146614 A1* | 6/2009 | Carrier | B25F 5/00 | 320/152 |
| 2009/0184682 A1* | 7/2009 | Kosugi | H01M 2/1016 | 320/134 |
| 2009/0224725 A1* | 9/2009 | Tatebayashi | H02J 7/0016 | 320/136 |
| 2009/0251104 A1* | 10/2009 | Yamamoto | H02J 7/0031 | 320/134 |
| 2010/0033134 A1* | 2/2010 | Funabashi | H02J 7/0029 | 320/136 |
| 2010/0085018 A1* | 4/2010 | Cruise | H01M 10/425 | 320/150 |
| 2010/0134305 A1* | 6/2010 | Lu | H02J 7/0021 | 340/636.13 |
| 2010/0141207 A1* | 6/2010 | Phillips | B25F 5/00 | 320/114 |
| 2010/0181966 A1* | 7/2010 | Sakakibara | B25F 5/00 | 320/136 |
| 2010/0188044 A1* | 7/2010 | Yamamoto | H01M 2/34 | 320/118 |
| 2010/0201327 A1* | 8/2010 | Takeda | H01M 2/34 | 320/154 |
| 2010/0207581 A1* | 8/2010 | Sakaue | H02J 7/0021 | 320/134 |
| 2010/0213900 A1* | 8/2010 | Carrier | H01M 2/1022 | 320/134 |
| 2010/0308771 A1* | 12/2010 | Densham | H01M 10/441 | 320/134 |
| 2011/0031939 A1* | 2/2011 | Funaba | B60K 6/445 | 320/166 |
| 2011/0101921 A1* | 5/2011 | An | H01M 10/42 | 320/134 |
| 2011/0133571 A1* | 6/2011 | Kiyohara | H01M 10/44 | 307/130 |
| 2011/0156650 A1* | 6/2011 | Yang | H02J 7/0014 | 320/118 |

(56) References Cited

U.S. PATENT DOCUMENTS

| | | | |
|---|---|---|---|
| 2011/0156656 A1* | 6/2011 | Saito | H02J 7/0031 320/134 |
| 2011/0163701 A1* | 7/2011 | Carrier | H01M 2/1022 318/139 |
| 2011/0163723 A1* | 7/2011 | Tan | H02J 9/005 320/134 |
| 2011/0169454 A1* | 7/2011 | Maruyama | H01M 10/425 320/118 |
| 2011/0169456 A1* | 7/2011 | Wang | H02J 7/0031 320/134 |
| 2011/0204850 A1* | 8/2011 | Kaino | H02J 7/0029 320/116 |
| 2011/0267009 A1* | 11/2011 | Nakatsuji | H01M 2/34 320/152 |
| 2011/0273137 A1* | 11/2011 | Nakatsuji | H01M 2/34 320/107 |
| 2011/0305925 A1* | 12/2011 | Ro | H01M 10/425 429/7 |
| 2012/0004873 A1* | 1/2012 | Li | B60L 3/0046 702/63 |
| 2012/0025770 A1* | 2/2012 | Suzuki | H02J 7/0021 320/118 |
| 2012/0032643 A1* | 2/2012 | Yun | H01M 2/34 320/134 |
| 2012/0105015 A1* | 5/2012 | Hermann | H02J 7/0031 320/164 |
| 2012/0212185 A1* | 8/2012 | Tanaka | H02J 7/0021 320/136 |
| 2012/0262123 A1* | 10/2012 | Lee | G01R 1/20 320/134 |
| 2012/0274266 A1* | 11/2012 | Yip | H02J 7/0004 320/106 |
| 2012/0274279 A1* | 11/2012 | Banos | H02J 7/0021 320/112 |
| 2012/0274280 A1* | 11/2012 | Yip | H02J 7/0014 320/112 |
| 2012/0280661 A1* | 11/2012 | Nam | H02J 7/0031 320/136 |
| 2012/0286732 A1* | 11/2012 | Cruise | H01M 10/425 320/112 |
| 2012/0319658 A1* | 12/2012 | White | H02J 7/0016 320/134 |
| 2013/0026974 A1* | 1/2013 | Huang | H02J 7/008 320/107 |
| 2013/0044002 A1* | 2/2013 | Schneider | H01M 10/441 340/636.2 |
| 2013/0057221 A1* | 3/2013 | Shibata | H02J 7/0029 320/134 |
| 2013/0099755 A1* | 4/2013 | Lei | H02H 7/18 320/134 |
| 2013/0106173 A1* | 5/2013 | Nomura | H02J 7/0016 307/9.1 |
| 2013/0106355 A1* | 5/2013 | Kim | H02J 7/0013 320/118 |
| 2013/0106356 A1* | 5/2013 | Nakao | B60L 11/1864 320/118 |
| 2013/0106363 A1* | 5/2013 | Seman, Jr. | H01M 2/1022 320/137 |
| 2013/0119934 A1* | 5/2013 | Suzuki | H02J 7/0016 320/112 |
| 2013/0154549 A1* | 6/2013 | Hanawa | H01M 2/1055 320/107 |
| 2013/0154564 A1* | 6/2013 | Goto | H01M 10/48 320/112 |
| 2013/0162217 A1* | 6/2013 | Gaul | H02J 7/00 320/134 |
| 2013/0193924 A1* | 8/2013 | Kurokawa | H02J 7/0029 320/112 |
| 2013/0200848 A1* | 8/2013 | Ozawa | B60L 11/1855 320/112 |
| 2013/0214739 A1* | 8/2013 | Lee | H02J 7/0016 320/118 |
| 2013/0214741 A1* | 8/2013 | Lee | H02J 7/0016 320/134 |
| 2013/0214745 A1* | 8/2013 | Funaba | B60K 6/445 320/166 |
| 2013/0229151 A1* | 9/2013 | Okada | H01M 10/44 320/112 |
| 2013/0257383 A1* | 10/2013 | Shim | H02J 3/32 320/134 |
| 2013/0271072 A1* | 10/2013 | Lee | H01M 10/4207 320/108 |
| 2013/0293197 A1* | 11/2013 | Sakakibara | B25F 5/00 320/118 |
| 2013/0307479 A1* | 11/2013 | Kim | H02J 7/007 320/112 |
| 2013/0307480 A1* | 11/2013 | Boggs | B60L 3/00 320/118 |
| 2013/0314033 A1* | 11/2013 | Maruyama | H01M 10/425 320/107 |
| 2014/0028262 A1* | 1/2014 | Nozawa | H01M 10/482 320/128 |
| 2014/0035534 A1* | 2/2014 | An | H01M 10/42 320/134 |
| 2014/0062416 A1* | 3/2014 | Nakashima | H02J 7/0021 320/134 |
| 2014/0152267 A1* | 6/2014 | Hashimoto | H01M 10/48 320/134 |
| 2014/0159671 A1* | 6/2014 | Kawahara | B60L 3/0046 320/134 |
| 2014/0217990 A1* | 8/2014 | Ikeuchi | H01M 10/48 320/134 |
| 2014/0239896 A1* | 8/2014 | Takeshita | H02J 7/0024 320/117 |
| 2014/0300325 A1* | 10/2014 | Wu | H01M 10/44 320/118 |
| 2015/0035494 A1* | 2/2015 | Suzuki | H01M 10/441 320/134 |
| 2015/0048795 A1* | 2/2015 | Hashimoto | H02J 7/045 320/126 |
| 2015/0054467 A1* | 2/2015 | Takano | H01M 10/48 320/136 |
| 2015/0207185 A1* | 7/2015 | Kono | H01M 10/4257 320/107 |
| 2015/0349551 A1* | 12/2015 | White | B60L 11/1861 320/112 |
| 2016/0043583 A1* | 2/2016 | Yoshida | H02J 7/0026 320/112 |
| 2016/0064965 A1* | 3/2016 | White | H02J 7/0016 320/134 |
| 2016/0197497 A1* | 7/2016 | Suzuki | H02J 7/0016 320/112 |

FOREIGN PATENT DOCUMENTS

| | | |
|---|---|---|
| JP | 2009-033936 A | 2/2009 |
| JP | 2009-261092 A | 11/2009 |

* cited by examiner

POWER STORAGE SYSTEM AND CELL PROTECTION METHOD WHICH PROTECTS THE CELL BY BOTH CUTTING FROM THE CELL PACK AND THE CELL PACK FROM THE SYSTEM

CROSS REFERENCE TO RELATED APPLICATIONS

This application is a National Stage of International Application No. PCT/JP2013/071300, filed Aug. 7, 2013, claiming priority based on Japanese Patent Application No. 2012-204149, filed Sep. 18, 2012, the contents of all of which are incorporated herein by reference in their entirety.

TECHNICAL FIELD

The present invention relates to a power storage system that has a protection function that protects a secondary cell.

BACKGROUND ART

A power storage system that is equipped with a secondary cell pack normally includes a protection function that protects the secondary cell in a secondary cell pack from abnormal states such as overcurrent, over-discharging, and overcharging.

For example, in a power storage system that uses, for example, conventional lead storage batteries as secondary cells, a system protection unit such as a power-supply control unit that is outside the secondary cell pack and that controls the charging and discharging of the secondary cells has a system protection function of detecting abnormal states of the secondary cells and cutting off the electrical connection between the secondary cells and the outside of the power storage system (refer to Patent Document 1).

In a power storage system that uses the recently developed lithium-ion secondary cells as secondary cells, a cell protection function is provided as a protection function in the secondary cell pack itself due to the necessity to monitor, for example, the voltage of each lithium secondary battery cell in order to detect abnormal states and due to the possibility that large currents may flow through the secondary cells. In the cell protection function, the cell protection unit that is provided in the secondary cell pack detects abnormal states of the secondary cells and cutting off the electrical connection between the secondary cells and the outside of the secondary cell pack (refer to Patent Document 2).

LITERATURE OF THE PRIOR ART

Patent Documents

Patent Document 1: Japanese Unexamined Patent Application Publication No. 2009-033936
Patent Document 2: Japanese Unexamined Patent Application Publication No. 2002-175128

SUMMARY OF THE INVENTION

Problem to be Solved by the Invention

However, in the cell protection function, the cutting off of the secondary cells from the outside of the secondary cell pack means that power is no longer supplied to the power-supply control unit of the power storage system. The problem therefore arises that, in order to return the power storage system from the protection state in which the secondary cells are protected to the normal state of carrying out charging/discharging, the entire power storage system must be rebooted, and utility consequently suffers.

In addition, when the system protection function is simply added to a power storage system that uses lithium ion secondary cells and the cell protection unit detects abnormal states, the following problems arise when the system protection unit then uses the system protection function to protect the secondary cells.

Due to the delay times of, for example, the time required for communication between the cell protection unit and the system protection unit or the time required for the system protection unit to execute the system protection function, the concern arises that the protection of the secondary cells will not be in time and the secondary cells will suffer damage. The delay time becomes particularly significant in a large power storage system that is provided with multiple stages of cell protection units, increasing the possibility that protection of the secondary cells will not be in time.

The present invention was realized with a view to solving the above-described problems and has as its object the provision of a power storage system and a cell protection method that can improve use efficiency while preventing damage to secondary cells.

Means for Solving the Problem

The power storage system according to the present invention is a power storage system provided with a secondary cell pack and further includes a system protection unit having a system protection function that cut off the electrical connection between the secondary cells and the outside of the power storage system; the secondary cell pack being provided with a secondary cell and a cell protection unit having a cell protection function that cutting off the electrical connection between the secondary cells and the outside of the secondary cell pack, the cell protection unit monitoring a state value that indicates the state of the secondary cell and that controls the execution of the system protection function and the cell protection function based on the state value.

The cell protection method according to the present invention is a cell protection method realized by a power storage system that is equipped with a secondary cell pack and a system protection unit having a system protection function that cuts off the electrical connection between the secondary cells and the outside of the power storage system, the secondary cell pack being equipped with a secondary cell and a cell protection unit having a cell protection function that cuts o off the electrical connection between the secondary cells and the outside of the outside of the secondary cell pack, and the cell protection method including steps of: monitoring a state value that indicates the state of the secondary cell, and controlling the execution of the system protection function and the cell protection function based on the state value.

Effect of the Invention

The present invention enables a more efficient operation while preventing damage to the secondary cell.

BEST MODE FOR CARRYING OUT THE INVENTION

Exemplary embodiments of the present invention are next described with reference to the accompanying drawings. In the following explanation, components having the same function are given the same reference number, and redundant explanation of such components may be omitted.

Figure 1:
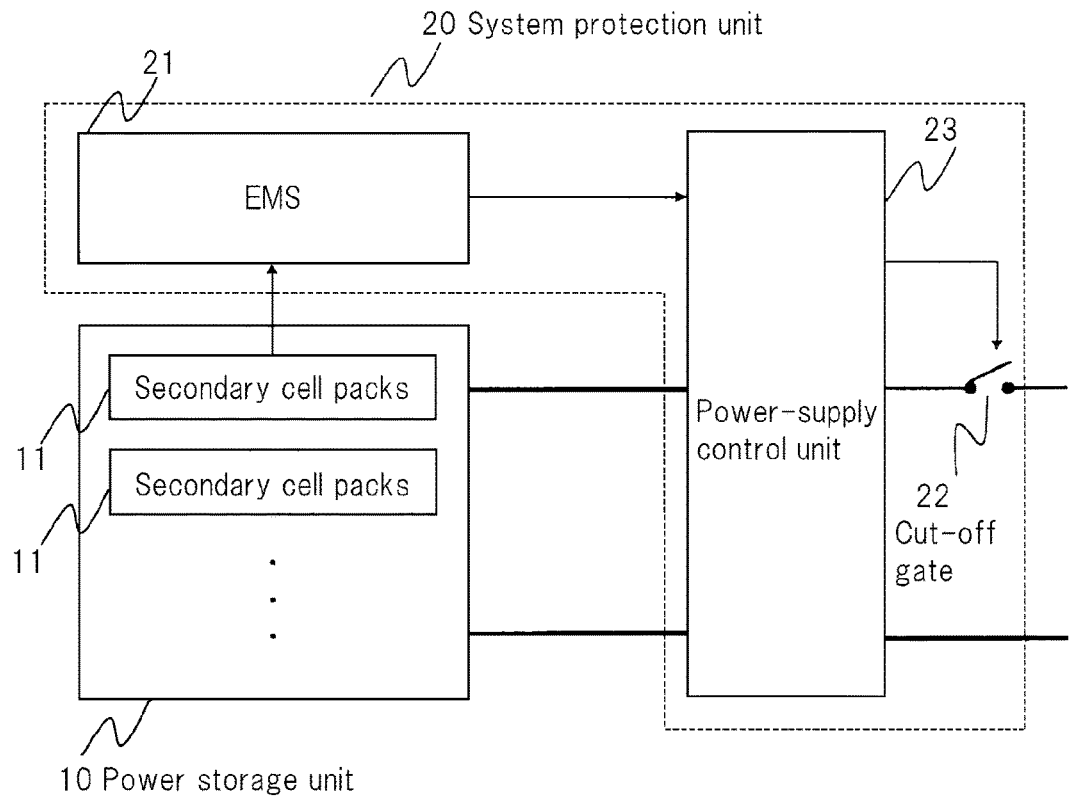
FIG. 1 is a block diagram showing the configuration of the power storage system of the first exemplary embodiment of the present invention.

FIG. 1 is a block diagram showing the configuration of the power storage system of the first exemplary embodiment of the present invention. In FIG. 1, power storage system 100 is equipped with power storage unit 10 and system protection unit 20.

Power storage unit 10 is made up of a group of secondary cell packs having a plurality of secondary cell packs 11. No particular limitation applies to the number of secondary cell packs 11, but the number may be, for example, 16. In addition, no particular limitation applies to the type of connection of each of the secondary cell packs 11, but in the present exemplary embodiment, each secondary cell pack 11 is assumed to be connected in parallel.

System protection unit 20 has a system protection function that cuts the electrical connection between power storage unit 10 and the outside of power storage system 100.

More specifically, system protection unit 20 includes EMS (Energy Management System) 21, cut-off gate 22, and power-supply control unit 23.

EMS 21 reports to power-supply control unit 23 a system halt instruction that is transmitted from each secondary cell pack.

Cut-off gate 22 is a switch that switches between connecting and disconnecting the electrical connection between power storage unit 10 and the outside of power storage system 100.

Power-supply control unit 23 controls the charging/discharging of each secondary cell pack 11 in power storage unit 10. In addition, power-supply control unit 23, upon receiving a system halt instruction from EMS 21, uses cut-off gate 22 to cut off power storage unit 10 from the outside of power storage system 100.

Figure 2:
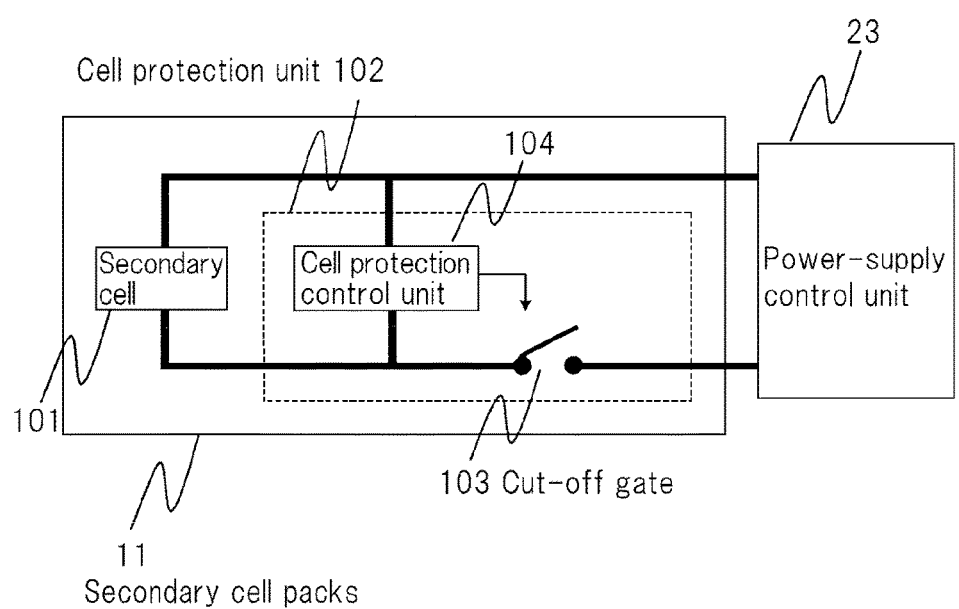
FIG. 2 shows an example of the configuration of a secondary cell pack in the power storage system of the first exemplary embodiment of the present invention.

FIG. 2 shows an example of the configuration of secondary cell pack 11. In FIG. 2, secondary cell pack 11 includes secondary cell 101 and cell protection unit 102.

No particular limitations apply to secondary cell 101 as long as it is a rechargeable cell, and secondary cell 101 may, for example, be a lithium-ion secondary cell.

Cell protection unit 102 has a cell protection function that cuts the electrical connection between secondary cell 101 and the outside of secondary cell pack 11.

Cell protection unit 102 monitors a state value that indicates the state of secondary cell 101, and based on this state value, controls the execution of its own cell protection function, communicates the state value to EMS 21 for causing execution of the system protection function by system protection unit 20, and supplies a command to execute system protection. The state value of secondary cell 101 includes at least one value from among the current value, the voltage value, and the temperature of the secondary cell.

In more concrete terms, cell protection unit 102 includes cut-off gate 103 and cell protection control unit 104.

Cut-off gate 103 is a switch that switches between connection and disconnecting the electrical connection between secondary cell 101 and the outside of secondary cell pack 11.

Cell protection control unit 104 monitors the state value of secondary cell 101, and when this state value diverges from a normal range that has been determined in advance, based on the state value, executes transfer of the state value to EMS 21 for causing execution of the system protection function or executes the cell protection function. More specifically, when the state value diverges from the normal range, cell protection control unit 104 changes, for example, the protection function that is executed or the timing of executing the protection function in accordance with whether the state value is contained in the warning range that is adjacent to the normal range or whether the state value is contained in the cell halt range that is adjacent to the warning range. The warning range and the cell halt range are not included in the normal range.

Cell protection control unit 104 is capable of executing the system protection function by transmitting a system halt instruction to system protection unit 20. Cell protection control unit 104 is further able to execute the cell protection function by using cut-off gate 103 to cut off secondary cell 101 from the outside of secondary cell pack 11.

In addition, the normal range is a range in which the state value is normally present at the time of charging or discharging secondary cell 101. Long continuance of the state value in the warning range raises the possibility of heating of circuit components in the pack of secondary cell 101 or of damage to the life of secondary cell 101. The cell halt range is a range that the state value reaches due to, for example, temporary fluctuation of the state value, and is a range in which danger arises of damage to secondary cell 101 in even a relatively short time interval. The normal range, warning range, and cell halt range are determined in advance according to, for example, the configuration or type of secondary cell 101. For example, the time interval until a temperature is reached that can affect the cell life depends on the current value and can therefore determine the relation between the warning range or cell halt range and a halt postponement time interval.

Figure 3:
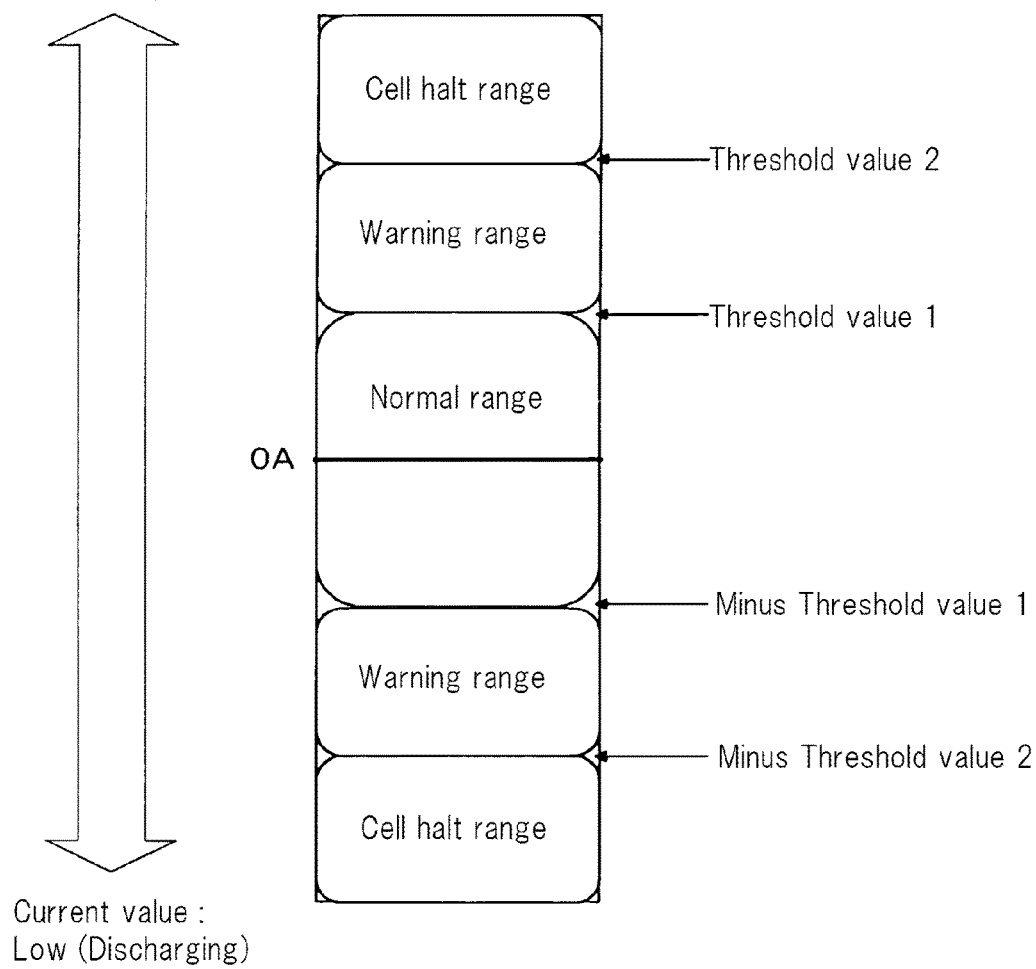
FIG. 3 shows an example of the normal range, warning range, and cell halt range.
Figure 4:
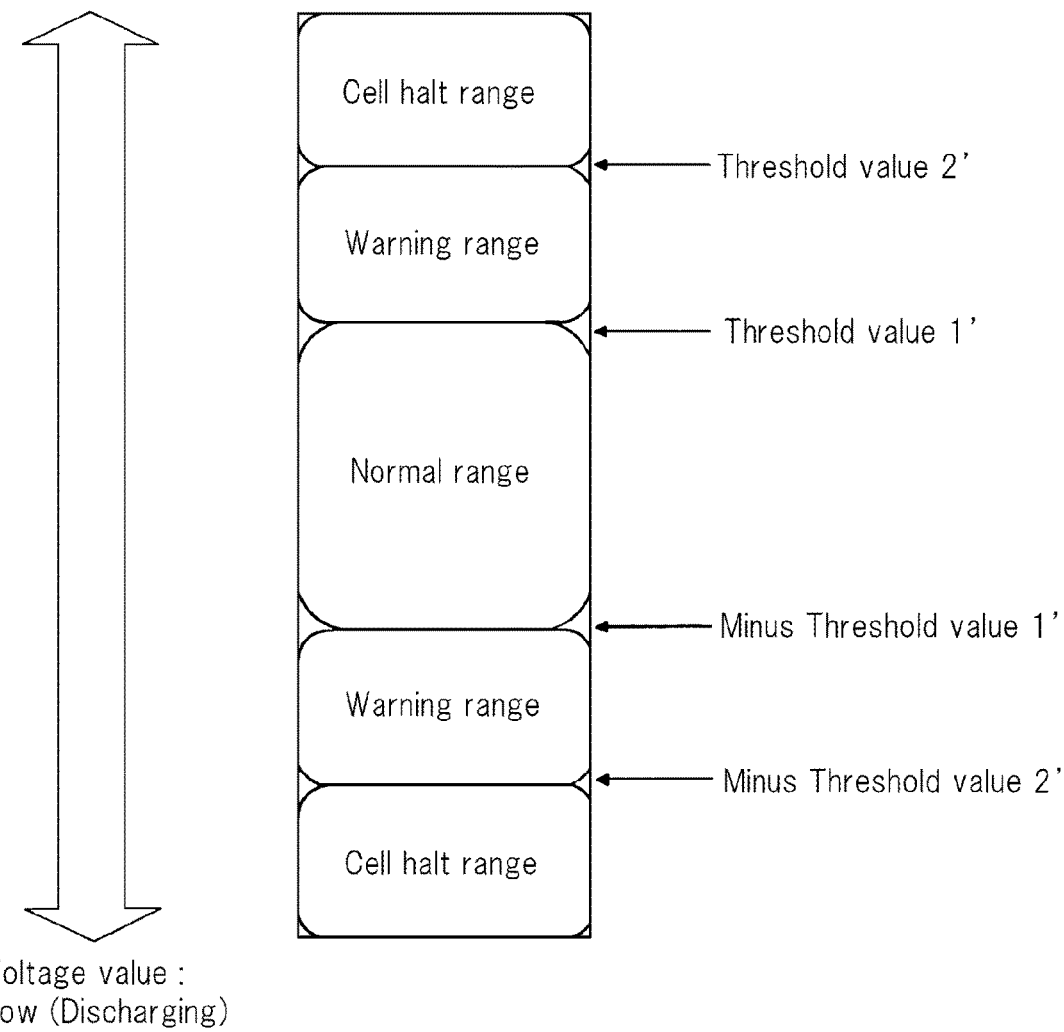
FIG. 4 shows another example of the normal range, warning range, and cell halt range.

FIG. 3 and FIG. 4 show examples of the normal range, the warning range, and the cell halt range.

In the example of FIG. 3, the state value is assumed to be the current value. In addition, the normal range is the range higher than minus threshold value 1 and lower than threshold value 1. The warning range is the range higher than minus threshold value 2 and equal to or lower than minus threshold value 1 and the range equal to or higher than threshold value 1 and lower than threshold value 2. The cell halt range is the range equal to or lower than minus threshold value 2 and equal to or higher than threshold value 2. The current value is assumed to be positive during charging of secondary cell 101.

In the example of FIG. 4, the state value is the voltage value. In addition, the ordinary range is the range higher than threshold value 3' and lower than threshold value 1'. The warning range is the range higher than threshold value 4' and equal to or lower than threshold value 3' and the range equal to or higher than threshold value 1' and lower than threshold value 2'. The cell halt range is the range equal to or lower than threshold value 4' and the range equal to or higher than threshold value 2'.

When the state value is temperature, the normal range, warning range, and cell halt range can also be determined as in the example of FIG. 4.

Figure 5:
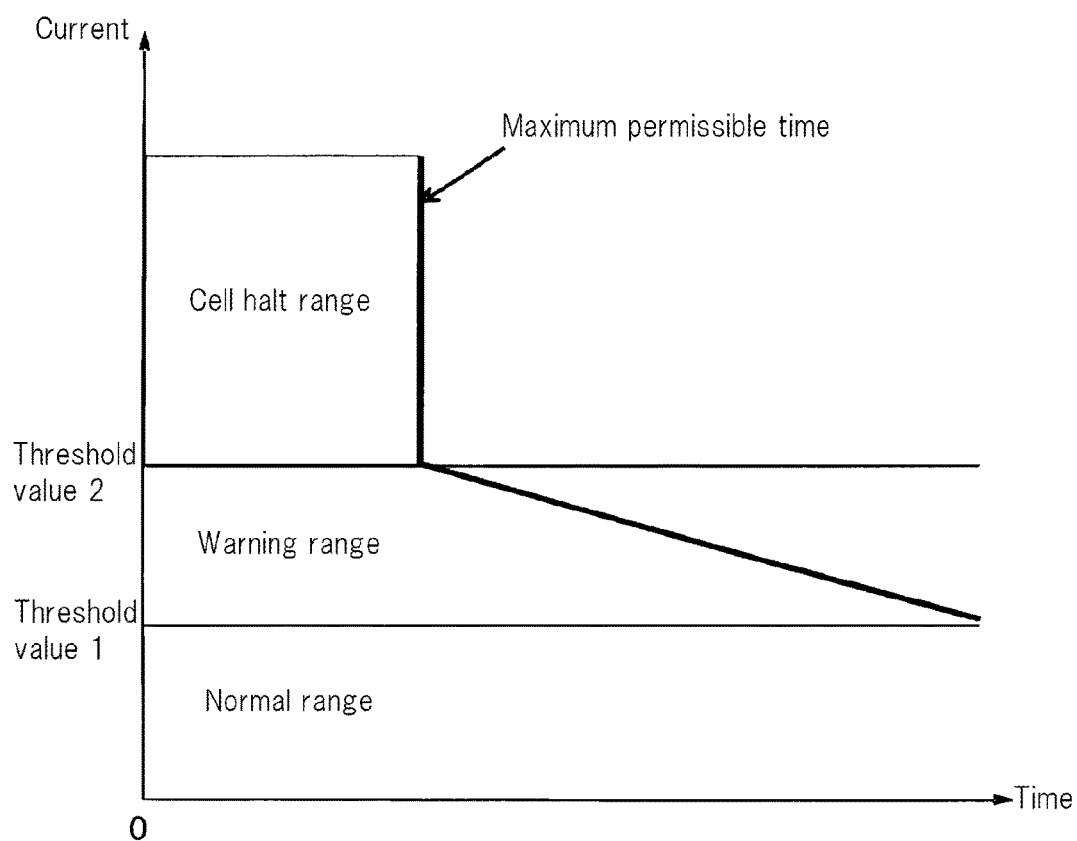
FIG. 5 is a view for describing in greater detail the processes carried out by the cell protection control unit.

FIG. 5 is a view for describing in greater detail the processes carried out by cell protection control unit 104. In FIG. 5, it is assumed that the state value is the current value and that charging of secondary cell 101 is being carried out.

When charging of secondary cell 101 is being carried out, the current value of secondary cell 101 is basically contained in the normal range. In this case, charging of secondary cell 101 over a long time interval poses no problem, and execution of the protection function is not necessary.

However, when the current value of secondary cell 101 for any reason diverges from the normal range, the execution of the protection function becomes necessary.

When the current value is within the cell halt range at this time, the time until secondary cell 101 is affected is short, and there is consequently a possibility that, even though cell protection control unit 104 transmits a system halt instruction to attempt execution of the system protection function, the protection of secondary cell 101 realized by the system protection function may not be in time and secondary cell 101 will suffer damage. As a result, cell protection control unit 104 executes the cell protection function to quickly protect secondary cell 101.

On the other hand, if the current value is within the warning range, the time until secondary cell 101 is affected is relatively long, and cell protection control unit 104 therefore determines based on the change of the state value that protection of secondary cell 101 realized by the system protection function will be in time and thus executes the system protection function or the cell protection function.

More specifically, when the current value is within the warning range, cell protection control unit 104, based on change of the state value, predicts a halt postponement time until protection of secondary cell 101 becomes necessary. The halt postponement time is the halt arrival time until the state value arrives at the cell halt range, or the maximum permissible time that the state value can be permitted to remain in the warning range. In addition, the halt postponement time may be whichever is shorter: the halt arrival time or the maximum permissible time. The maximum permissible time changes according to the state value. In addition, in order to rapidly predict the halt postponement time, the change of the state value is preferably the change of state value that precedes the time at which the state value diverges from the normal range.

For example, cell protection control unit 104, based on the change of the state value before the time at which the state value diverges from the normal range, finds a change curve that indicates the change of the state value, and then predicts a halt arrival time that is the time until the state value reaches the cell halt range as the halt postponement time assuming that the state value changes in accordance with this change curve even after the state value has diverged from the normal range.

Alternatively, based on the change curve, cell protection control unit 104 finds the average value from the time the state value diverges from the normal range until it reaches the cell halt range, and then calculates the maximum permissible time according to this average value. Cell protection control unit 104 may then predict whichever is shorter—the halt arrival time or the maximum permissible time, as the halt postponement time.

Upon predicting the halt postponement time, cell protection control unit 104 judges whether this halt postponement time is longer than the system halt delay time that was determined in advance. The system halt delay time is the time required for executing the system protection function and is determined in advance according to the circuit configuration of power storage system 100. The system halt delay time is the sum of the time required until the cell protection unit transmits a system halt instruction, the time required from the transmission of the system halt instruction until power-supply control unit 23 receives the system halt instruction, and the time required from the reception of the system halt instruction by power-supply control unit 23 until the electrical connection between secondary cell pack 11 and the outside of power storage system 100 is cut.

When the halt postponement time is longer than the system halt delay time, the protection of secondary cell 101 realized by the system protection function will be in time, and cell protection control unit 104 therefore executes the system protection function. More specifically, cell protection control unit 104 executes the system protection function by transmitting to system protection unit 20 a system halt instruction after the passage of a system deferment time, that is obtained by subtracting the system halt delay time from the halt postponement time, from the time the state value diverges from the normal range.

On the other hand, when the halt postponement time is equal to or less than the system halt delay time, protection of secondary cell 101 realized by the system protection function will not be in time, and cell protection control unit 104 therefore executes the cell protection function. More specifically, cell protection control unit 104 executes the cell protection function after the passage of the cell deferment time from that the time the state value diverges from the normal range when the cell deferment time that is obtained by subtracting the cell halt delay time that was determined in advance from the halt postponement time is equal to or greater than 0, and immediately executes the cell protection function when the cell deferment time is negative.

The cell halt delay time is the time required for the execution of the cell protection function and is determined in accordance with the circuit configuration of secondary cell pack 11. The cell halt delay time is shorter than the system halt delay time. The system deferment time and the cell deferment time are together referred to as the deferment time.

The operation of power storage system 100 is next described.

Figure 6:
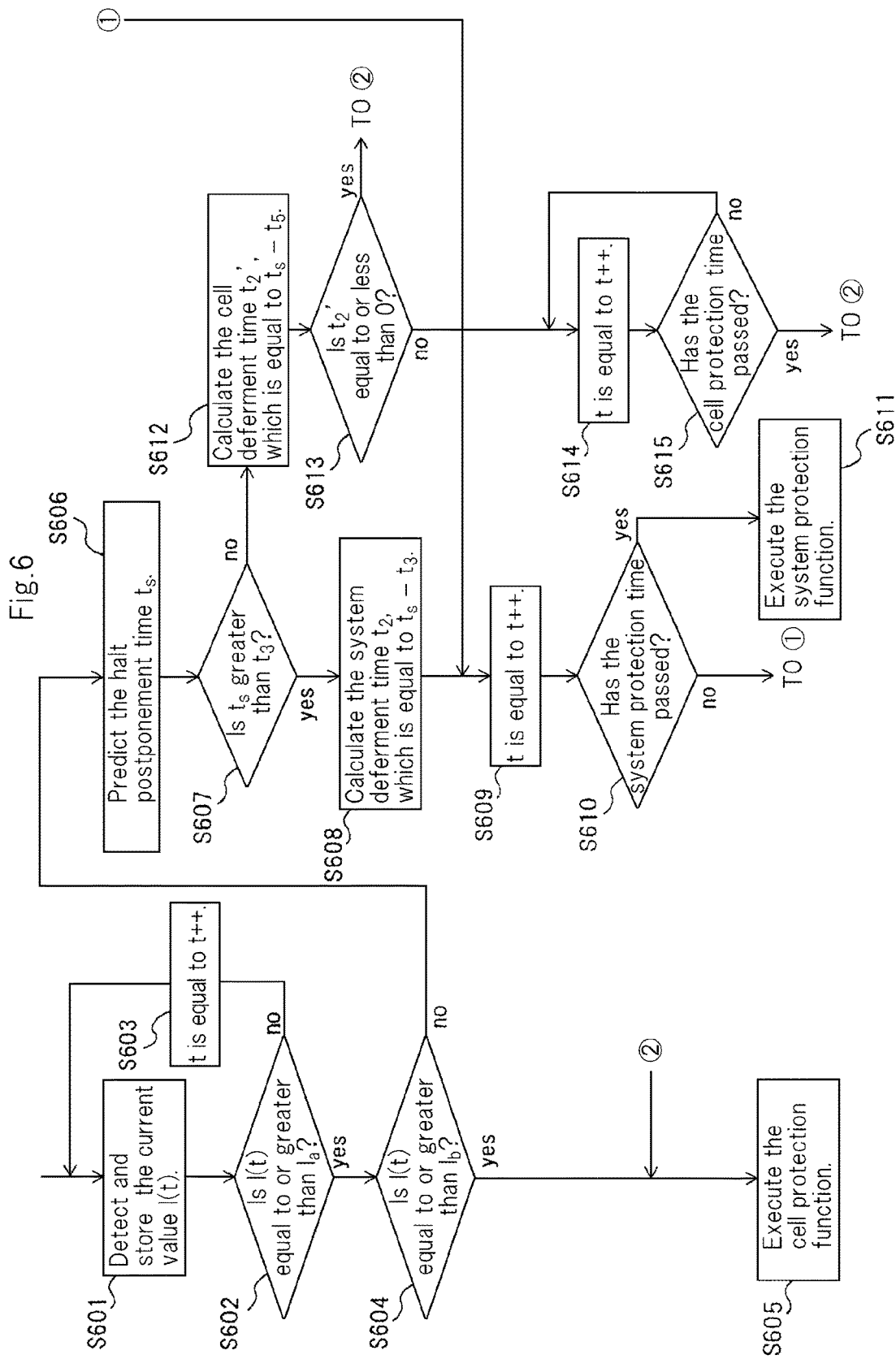
FIG. 6 is a flow chart for describing an example of the operation of the power storage system of the first exemplary embodiment of the present invention.

FIG. 6 is a flow chart for describing an example of the operation of power storage system 100. In the following operations, the state value is assumed to be the current value. In addition, secondary cell 101 is assumed to be undergoing charging, i.e., the current value is assumed to be a positive value.

Cell protection control unit 104 first detects the current value I(t) that flows to secondary cell 101 as the state value and stores this current value I(t) (Step S601). Cell protection control unit 104 then judges whether the detected current value I(t) is equal to or greater than the threshold value $I_a$ (Step S602). The threshold value $I_a$ is the minimum value of the warning range in the positive direction of the current value I(t) and corresponds to threshold value 1 of FIG. 3.

When the current value I(t) is lower than the threshold value $I_a$, cell protection control unit 104 enters standby for a fixed time interval (Step S603) and then returns to the process of Step S601.

On the other hand, when the current value I(t) is equal to or greater than the threshold value $I_a$, cell protection control unit 104 judges that the current value I(t) has diverged from the normal range and then judges whether the current value I(t) is equal to or greater than the threshold value $I_b$ (Step S604). The threshold value $I_b$ is the minimum value of the cell halt range in the positive direction of the current value I(t) and corresponds to threshold value 2 of FIG. 4.

When the current value I(t) is equal to or greater than the threshold value $I_b$, cell protection control unit 104 judges that the current value I(t) is within the cell halt range, and then executes the cell protection function in which cut-off gate 103 is used to cut the electrical connection between secondary cell 101 and the outside of secondary cell pack 11 (Step S605).

On the other hand, when the current value I(t) does not attain the threshold value $I_b$, cell protection control unit 104 finds the change of the current value I(t) from the current value I(t) that is stored, and based on the change of this current value I(t), calculates the halt postponement time $t_s$ (Step S606).

Cell protection control unit 104 then judges whether the halt postponement time $t_s$ is longer than the system halt delay time $t_3$ (Step S607).

If the halt postponement time $t_s$ is longer than the system halt delay time $t_3$, cell protection control unit 104 calculates the system deferment time $t_2$ that is obtained by subtracting the system halt delay time $t_3$ from the halt postponement time $t_s$ (Step S608).

Cell protection control unit 104 then enters standby for a fixed time interval (Step S609) and then judges whether the system deferment time $t_2$ has elapsed from the time point that Step S608 ended (Step S610).

When the system deferment time $t_2$ has elapsed, cell protection control unit 104 executes the system protection function by transmitting a system halt instruction to power-supply control unit 23 by way of EMS 21 (Step S611). On the other hand, when the system deferment time $t_2$ has not elapsed, cell protection control unit 104 returns to the process of Step S609.

When the halt postponement time $t_s$ is equal to or less than the system halt delay time $t_3$ in Step S607, cell protection control unit 104 calculates the cell deferment time $t_2$ that is obtained by subtracting the cell halt time $t_5$ from the halt postponement time $t_s$ (Step S612). Cell protection control unit 104 then judges whether the cell deferment time $t_2$ is equal to or less than 0 (Step S613).

If the cell deferment time $t_2$ is less than or equal to 0, cell protection control unit 104 executes the process of Step S605, i.e., the cell protection function. On the other hand, if the cell deferment time $t_2$ is longer than 0, cell protection control unit 104 enters standby for a fixed time interval (Step S614), and then judges whether the cell deferment time $t_2$ has elapsed from the time that Step S612 ended (Step S615).

If cell deferment time $t_2$ has elapsed, cell protection control unit 104 executes the process of Step S605, i.e., the cell protection function. On the other hand, if cell deferment time $t_2$ has not elapsed, cell protection control unit 104 returns to the process of Step S614.

When power storage system 100 monitors a plurality of values such as the current value and the voltage value as the state values, operations such as described above are carried out for each state value.

Power storage system 100 and a power storage system having only the cell protection function or the system protection function are next compared.

Figure 7:
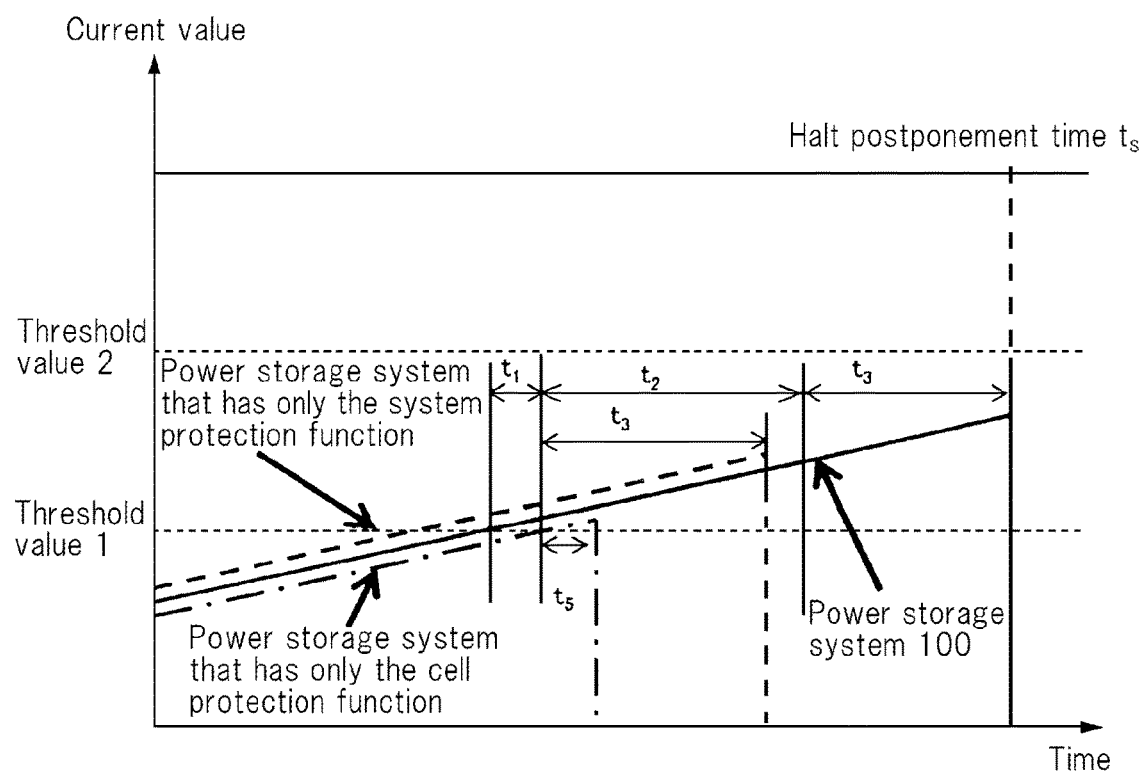
FIG. 7 is a view for comparing the power storage system of the first exemplary embodiment of the present invention with the related art.
Figure 8:
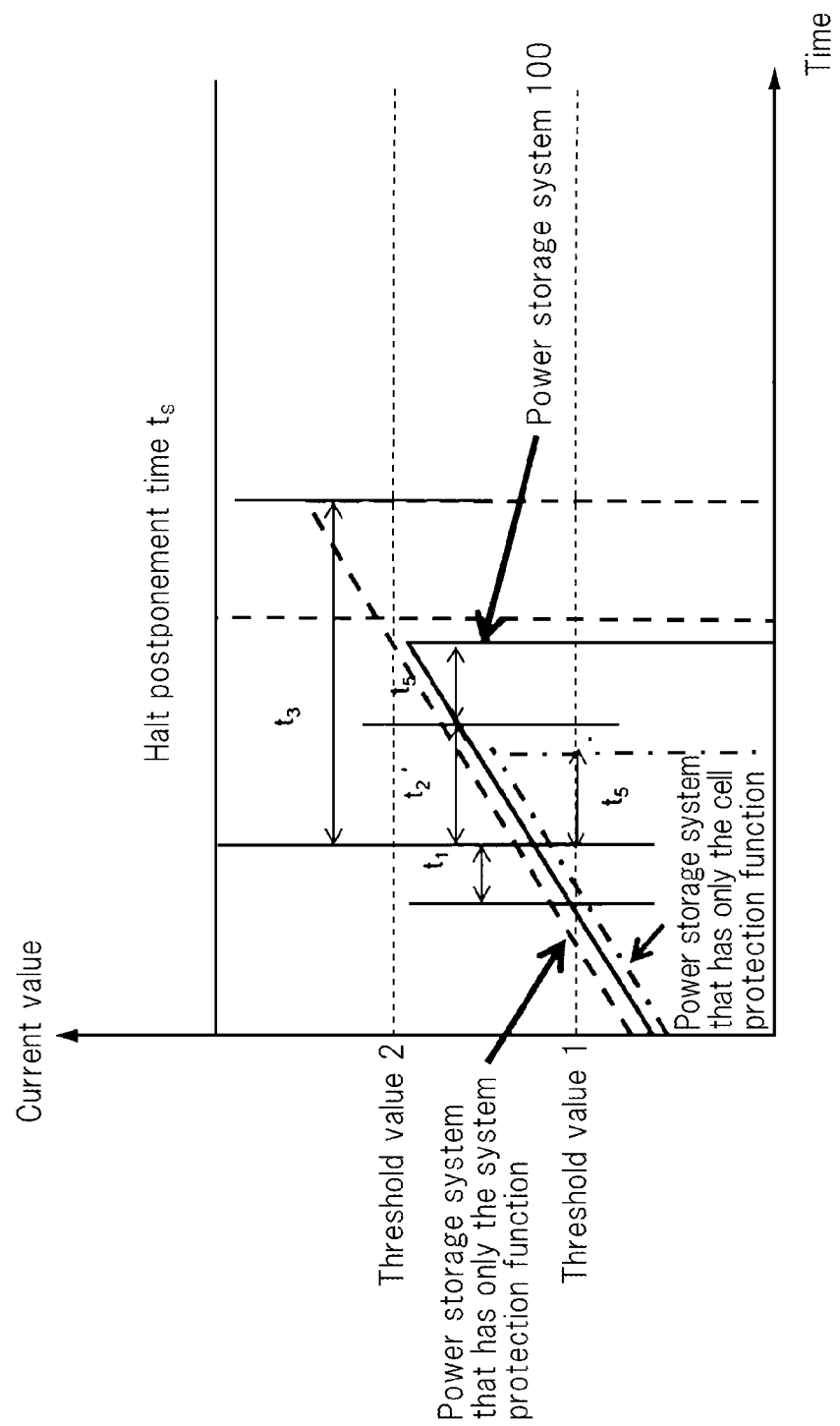
FIG. 8 is a view for comparing the power storage system of the first exemplary embodiment of the present invention with the related art.
Figure 9:
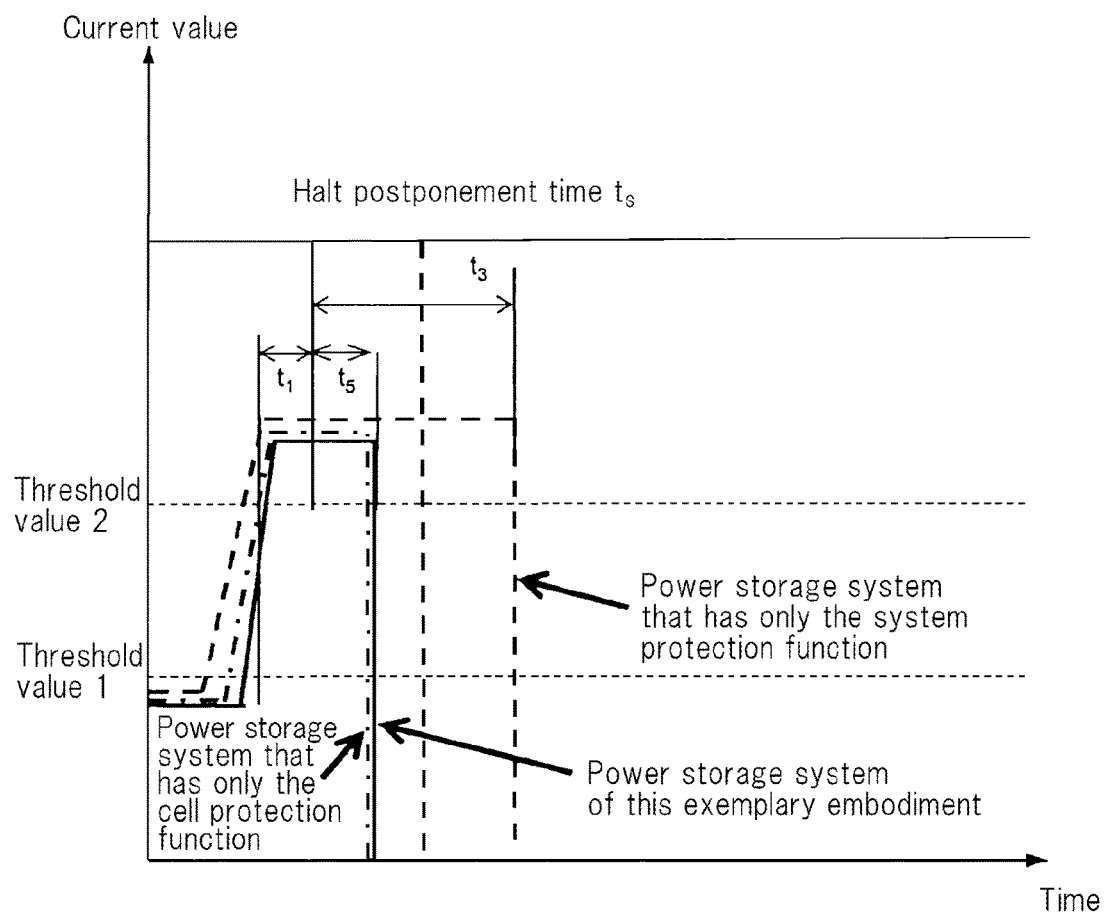
FIG. 9 is a view for comparing the power storage system of the first exemplary embodiment of the present invention with the related art.

FIGS. 7-9 are views for comparing the power storage system of the present exemplary embodiment with a power storage system having only the cell protection function or the system protection function.

FIG. 7 shows the timing at which protection functions are executed when, at the point in time at which it is determined that the current value diverges from the normal range, the current value is within the warning range, and moreover, halt postponement time $t_s$ is longer than system halt delay time $t_3$.

In each of the above-described power storage systems, the current detection delay time $t_1$ that is required for the detection of the current value extends from the time the current value actually equals or surpasses threshold value 1 until it is determined that the current value is equal to or greater than threshold value 1.

In a power storage system having only the cell protection function, the electrical connection between secondary cell 101 and the outside of secondary cell pack 11 is cut by the cell protection function when the cell halt time $t_5$ has elapsed from the time at which the current detection delay time $t_1$ has elapsed, resulting in a state in which immediate recovery is problematic.

In a power storage system that only has the system protection function, a system halt instruction is transmitted at the time that the current detection delay time $t_1$ has elapsed, whereby the electrical connection between secondary cell pack 11 and the outside of power storage system 100 is cut after the passage of the system halt delay time $t_3$ from the time at which the current detection delay time $t_1$ has elapsed. In this case, charging ends considerably before secondary cell 101 is affected, whereby the charging time is shortened.

In contrast, in power storage system 100, a system halt instruction is transmitted after the passage of the system deferment time $t_2$ from the time at which the current detection delay time $t_1$ has elapsed, whereby charging can be carried out until immediately before secondary cell 101 is affected, and the charging time can be increased.

FIG. 8 shows the timing at which the protection function is executed when, at the time it is determined that the current value has diverged from the normal range, the current value is within the warning range, and moreover, the halt postponement time $t_s$ is equal to or less than the system halt delay time $t_3$.

In a power storage system that only has the cell protection function, the electrical connection between secondary cell 101 and the outside of secondary cell pack 11 is cut by the cell protection function upon the passage of the cell halt time $t_5$ from the time at which the current detection delay time $t_1$ has elapsed, resulting in a state in which immediate recovery is problematic, similar to the example of FIG. 7.

In a power storage system that only has the system protection function, the halt postponement time $t_s$ is equal to or less than the system halt delay time $t_3$, whereby the current value exceeds threshold value 2 at the time when the electrical connection between secondary cell pack 11 and the outside of the power storage system by the system protection function. As a result, there is a high possibility of damage to secondary cell pack 11.

In power storage system 100, in contrast, the cell protection function is executed after the passage of the cell deferment time $t_2$ from the time that the current detection delay time $t_1$ has elapsed, whereby charging can be carried out until immediately before secondary cell 101 is affected, and the charging time can be increased.

FIG. 9 shows the timing of executing a protection function when the current value has reached the cell halt range at the time when the current value is determined to have diverged from the normal range.

In a power storage system having only the system protection function, secondary cell 101 is not protected until the halt postponement time $t_s$ has elapsed from the time that the current detection delay time $t_1$ has elapsed, whereby the protection of secondary cell 101 is not in time and the potential arises of damage to secondary cell 101.

In contrast, in a power storage system that only has the cell protection function and power storage system 100, the electrical connection between secondary cell 101 and the outside of secondary cell pack 11 is cut by the cell protection function upon the passage of the cell halt time $t_5$ from the time at which the current detection delay time $t_1$ has elapsed, whereby secondary cell 101 can be quickly protected.

According to the present exemplary embodiment as described hereinabove, because the execution of the system protection function and cell protection function is controlled based on the state value of secondary cell 101, the appropriate protection function can be executed according to the state value of secondary cell 101. Accordingly, the efficiency of the power storage system can be improved while preventing damage to secondary cell 101.

In the present exemplary embodiment, moreover, when the state value of secondary cell 101 diverges from the normal range, the system protection function or the cell protection function is executed based on the state value of secondary cell 101, with the result that the system protection function or the cell protection function can be executed at the appropriate timing.

In the present exemplary embodiment, moreover, the system protection function or the cell protection function is executed based on the change of the state value when the state value is within the warning range that is adjacent to the normal range, and the cell protection function is executed when the state value is within the cell halt range that is adjacent to the warning range. As a result, when secondary cell 101 must be protected quickly, priority is given to the prevention of damage to secondary cell 101 and the cell protection function is used, but when there is sufficient time before secondary cell 101 is to be protected, secondary cell 101 can be protected by means of the system protection function while maintaining efficient of the power storage system In the present exemplary embodiment, when the state value is within the warning range, the system protection function is executed if the halt postponement time is longer than the system halt delay time, and the cell protection function is executed if the halt postponement time is equal to or less than the system halt delay time. As a result, the present exemplary embodiment enables a more appropriate selection of whether to prioritize the prevention of damage to secondary cell 101 or the protection of secondary cell 101 while maintaining efficient of the power storage system.

In the present exemplary embodiment, moreover, if the halt postponement time is longer than the system halt delay time, the system protection function is executed after the passage of a deferment time that is obtained by subtracting the system halt delay time from the halt postponement time. In addition, if the halt postponement time is equal to or less than the system halt delay time, the cell protection function is executed after the passage of the deferment time, which is derived by subtracting the cell halt delay time from the halt postponement time. As a result, the charging or discharging of secondary cell 101 can be carried out over a longer period within a range in which secondary cell 101 is not adversely affected. Accordingly, efficient operation of the power storage system can be improved.

The second exemplary embodiment of the present invention is next described.

In power storage system 100 of the present exemplary embodiment, new functions are added to cell protection unit 102 in power storage system 100 of the first exemplary embodiment.

More specifically, a function of cancelling the execution of the system protection function and the cell protection function when the state value returns to the normal range after having diverged from the normal range and a function of executing the cell protection function when the state value reaches the cell halt range within the system halt postponement time are added to cell protection control unit 104 of cell protection unit 102.

Figure 10:
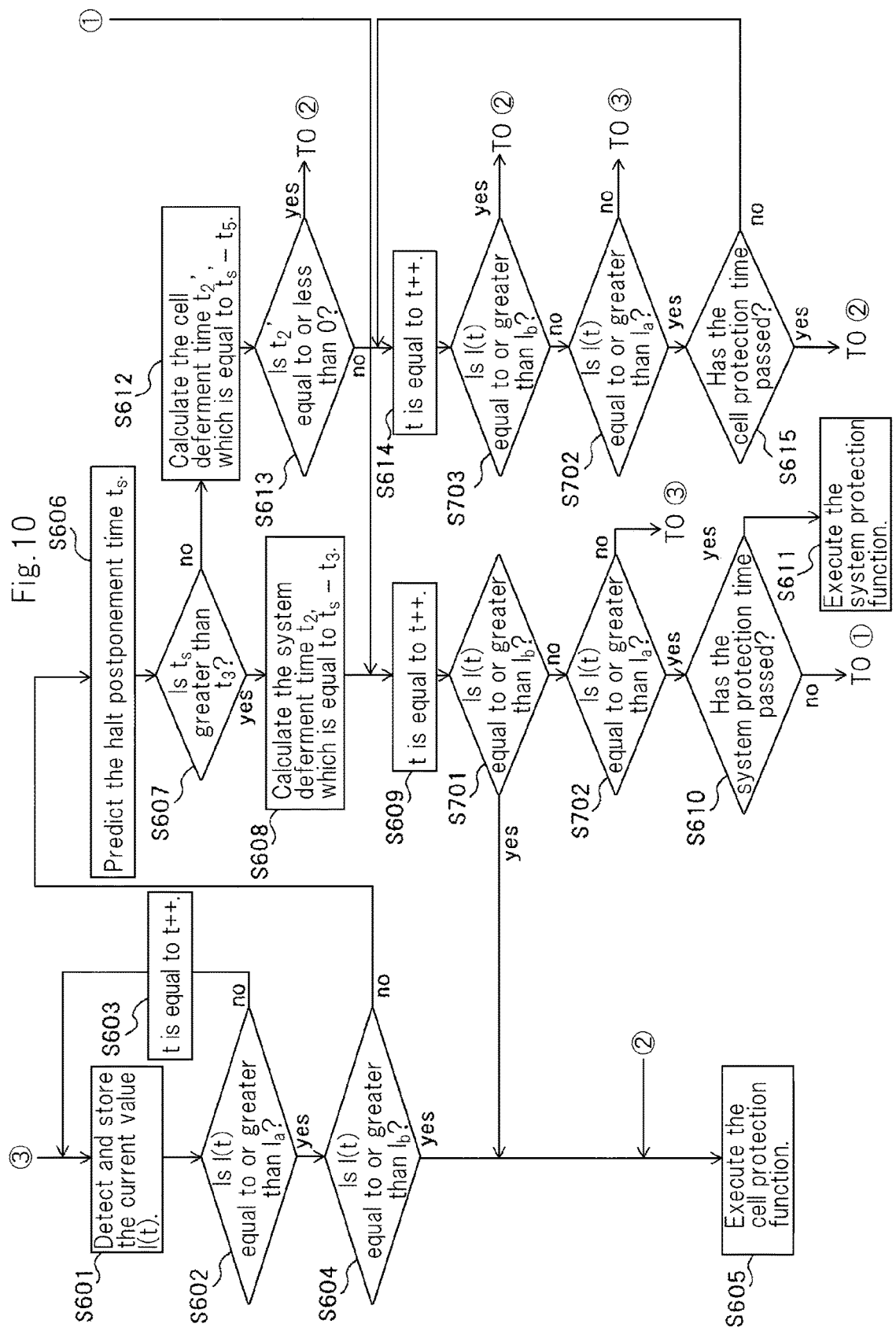
FIG. 10 is a flow chart for describing an example of the operation of the power storage system of the second exemplary embodiment of the present invention.

FIG. 10 is a flow chart for describing the operation of the power storage system of the present exemplary embodiment.

After the process of Step S609 that was described using FIG. 6 has been completed, cell protection control unit 104 judges whether the current value I(t) is equal to or greater than the threshold value $I_b$ (Step S701).

When the current value I(t) is equal to or greater than the threshold value $I_b$, cell protection control unit 104 executes the process of Step S605, i.e., the cell protection function. On the other hand, if the current value I(t) is less than $I_b$, cell protection control unit 104 judges whether the current value I(t) is equal to or greater than threshold value $I_a$ (Step S702).

When the current value I(t) is less than the threshold value $I_a$, cell protection control unit 104 cancels the execution of the system protection function and returns to the process of Step S601. On the other hand, when the current value I(t) is equal to or greater than the threshold value $I_a$, cell protection control unit 104 executes the process of Step S610.

In addition, when the process of Step S615 is completed, cell protection control unit 104 judges whether the current value I(t) is equal to or greater than the threshold value $I_b$ (Step S703).

If the current value I(t) is equal to or greater than the threshold value $I_b$, cell protection control unit 104 executes the process of Step S605, i.e., the cell protection function.

On the other hand, when the current value I(t) is below $I_b$, cell protection control unit 104 judges whether the current value I(t) is equal to or greater than the threshold value $I_a$ (Step S704).

When the current value I(t) is below the threshold value $I_a$, cell protection control unit 104 cancels the execution of the cell protection function and returns to the process of Step S601. On the other hand, when the current value I(t) is equal to or greater than the threshold value $I_a$, cell protection control unit 104 executes the process of Step S615.

According to the present exemplary embodiment as described above, due to the return of the state value to the normal range within the deferment time, the execution of the system protection function and the cell protection function is cancelled. Therefore, when there is no need to protect secondary cell 101, the execution of protection functions and the halting of charging or discharging of secondary cell 101 can be prevented. As a result, efficient operation of the power storage system can be improved.

In the present exemplary embodiment, the cell protection function is executed when the state value reaches the cell halt range within the deferment time, and as a result, secondary cell 101 can be more appropriately protected.

The third exemplary embodiment of the present invention is next described.

In power storage system 100 of the present exemplary embodiment, a new function in cell protection unit 102 is added to power storage system 100 of the second exemplary embodiment.

More specifically, a function is added to cell protection control unit 104 of cell protection unit 102 by which the system deferment time $t_2$ is updated by updating the halt postponement time $t_s$ with consideration given to the change of state value after the time that the state value diverges from the normal range within the deferment time (the system deferment time and cell deferment time).

Figure 11:
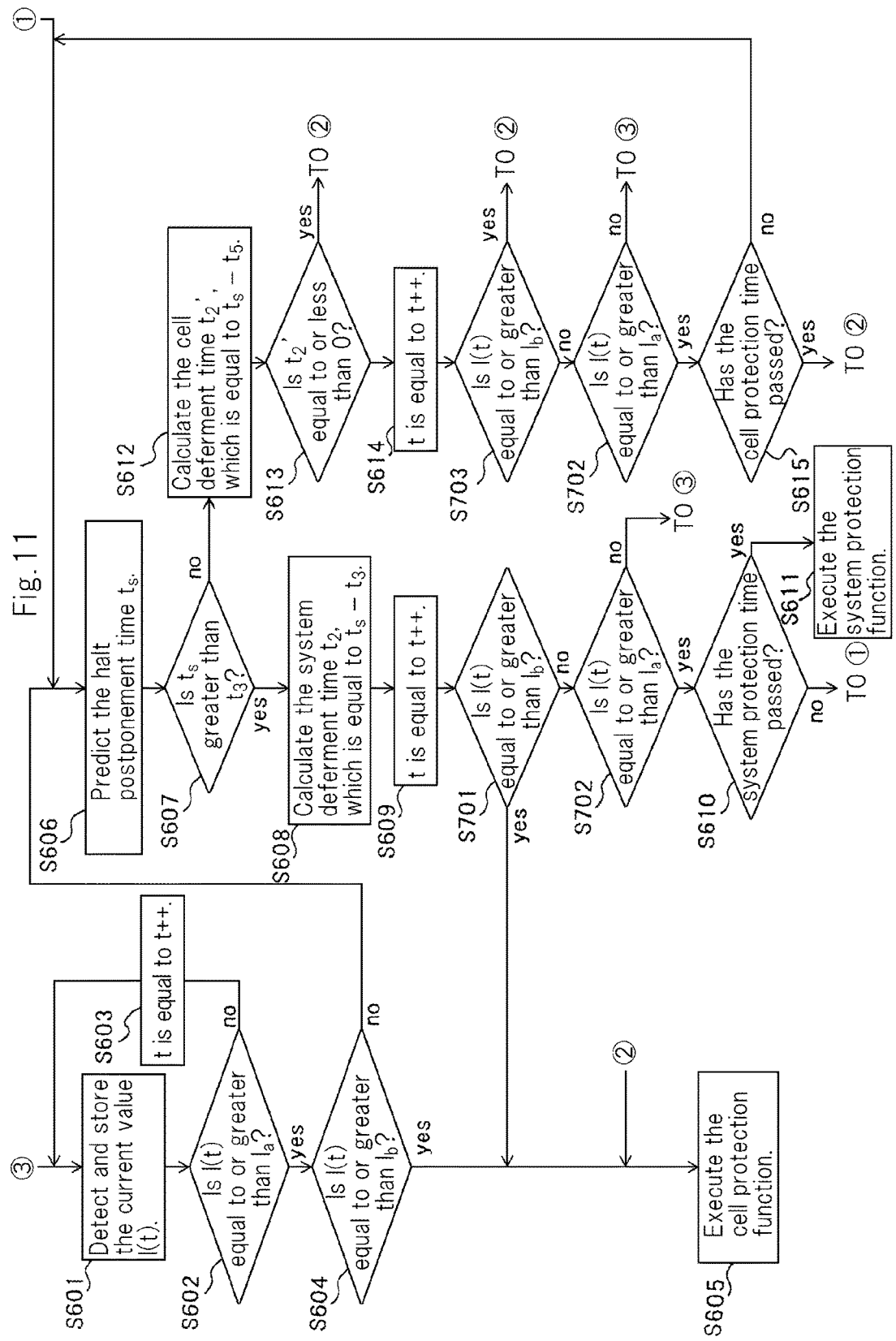
FIG. 11 is a flow chart for describing an example of the operation of the power storage system of the third exemplary embodiment of the present invention.

FIG. 11 is a flow chart for describing the operation of the power storage system of the present exemplary embodiment.

The operations in the flow chart shown in FIG. 11 differ from the operations of the second exemplary embodiment in that cell protection control unit 104 returns to Step S606 upon completing the processes of Steps S610 and S615.

Figure 12:
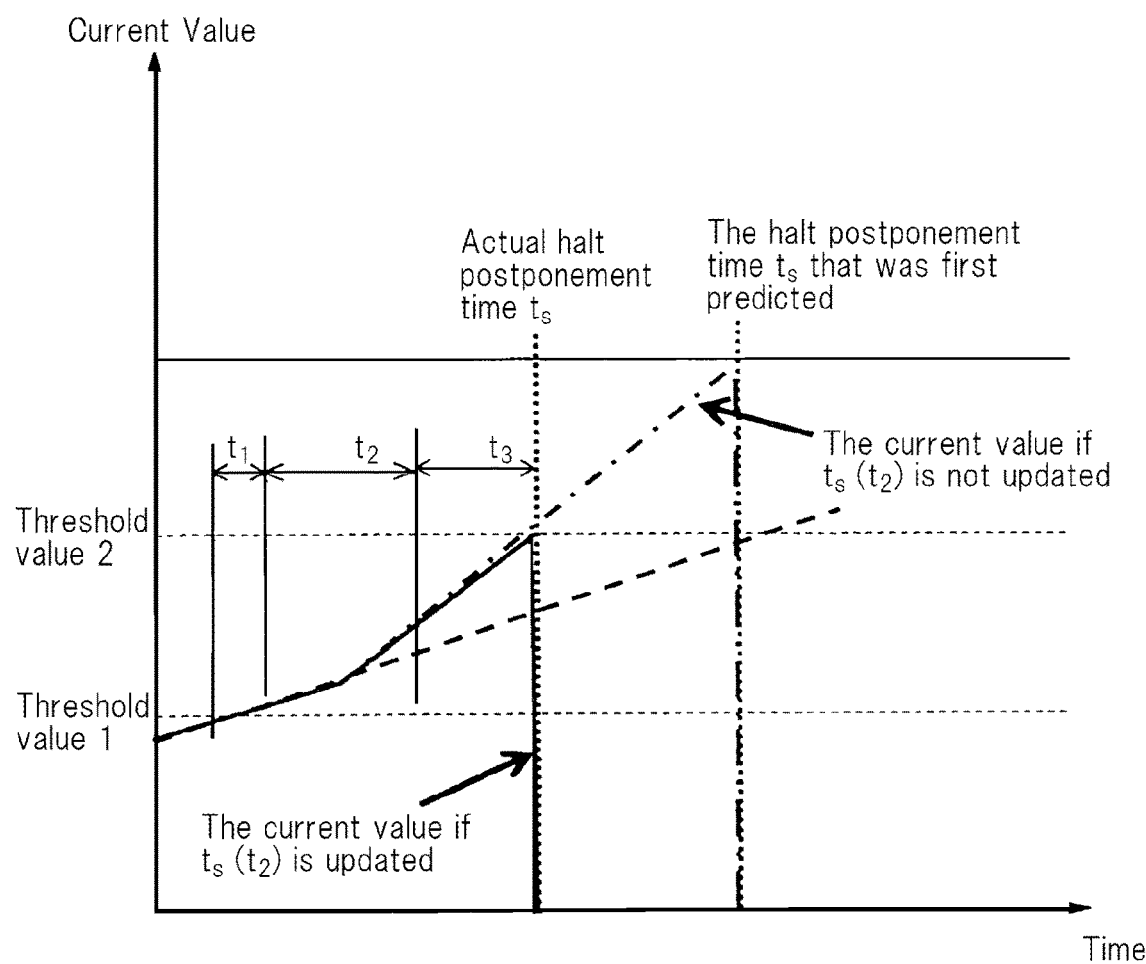
FIG. 12 is a view for describing an example of the distinguishing features of the power storage system of the third exemplary embodiment of the present invention.
Figure 13:
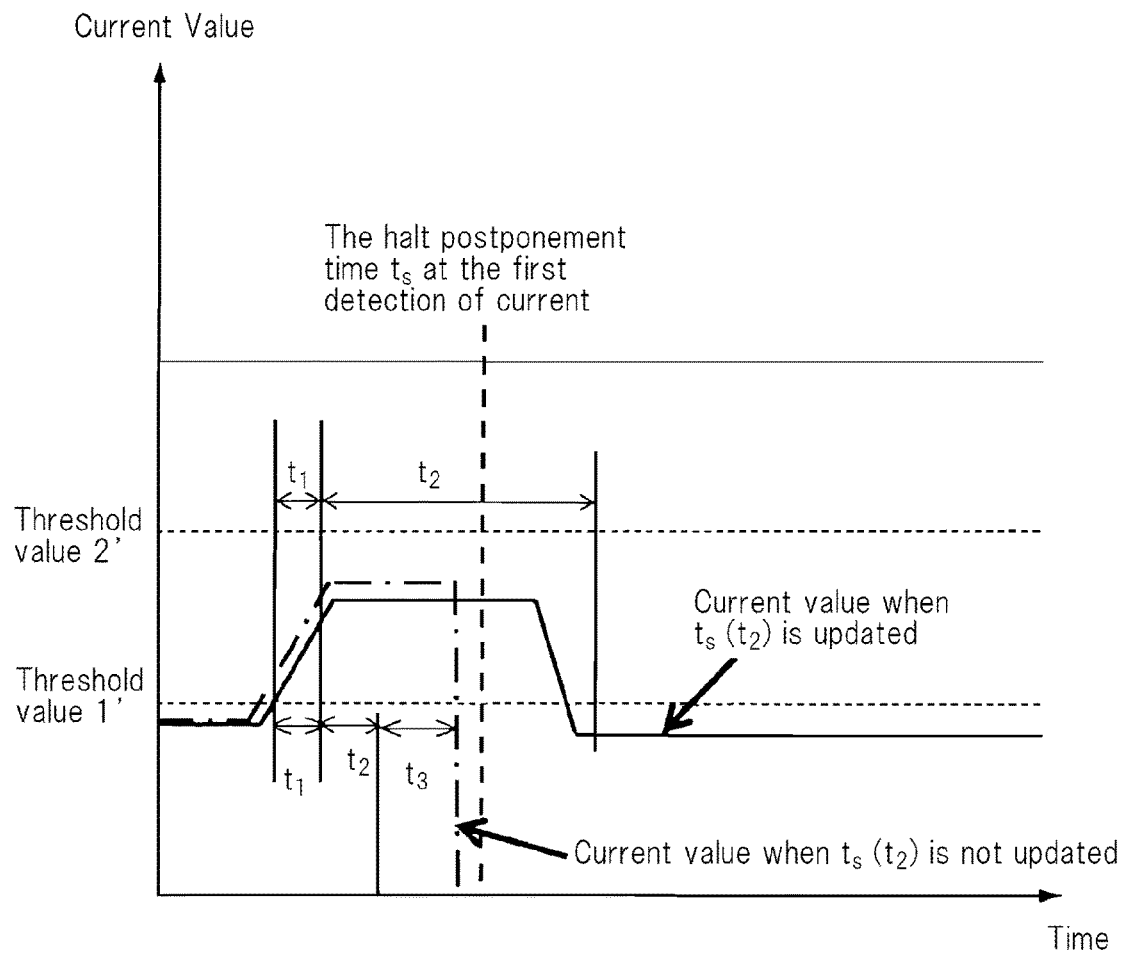
FIG. 13 is a view for describing another example of the distinguishing features of the power storage system of the third exemplary embodiment of the present invention.

FIGS. 12 and 13 are views for describing the distinguishing features of the power storage system of the present exemplary embodiment.

In the example of FIG. 12, the rate of rise of the current value after the current value surpasses threshold value 1 is great. If the halt postponement time $t_s$ is not updated in this case, the possibility arises that the current value will surpass threshold value 2 before secondary cell 101 is protected by the system protection function. In power storage system 100 of the present exemplary embodiment, the halt postponement time $t_s$ is updated, with the result that the current value can be prevented from surpassing threshold value 2.

In the example of FIG. 13, the rate of rise of the current value after the current value has surpassed threshold value 1 first becomes 0, following which the current value falls below threshold value 1. If the halt postponement time $t_s$ is not updated in this case, secondary cell 101 is protected even though there is no need to protect secondary cell 101, with the result that charging is halted. In the present exemplary embodiment, the halt postponement time $t_s$ is updated, with the result that the halt of the charging of secondary cell 101 can be prevented.

According to the present exemplary embodiment as described hereinabove, the halt postponement time $t_s$ is updated within the deferment time, thereby enabling not only the prevention of the execution of the protection function and the halting of the charging or discharging of secondary cell 101 when there is no need to protect secondary cell 101, but also the prevention of damage to secondary cell 101 when the rate of rise of the state value increases.

The fourth exemplary embodiment is next described.

Figure 14:
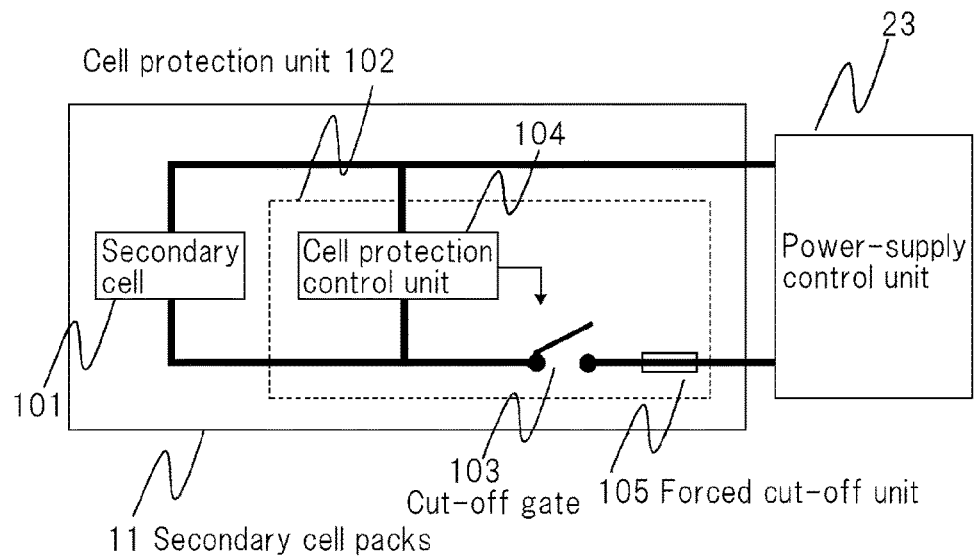
FIG. 14 shows an example of the configuration of the secondary cell pack in the power storage system of the fourth exemplary embodiment of the present invention.

FIG. 14 shows the configuration of secondary cell pack 11 in the power storage system of the present exemplary embodiment. Compared to secondary cell pack 11 shown in FIG. 2, forced cut-off unit 105 has been added to cell protection unit 102 in secondary cell pack 11 shown in FIG. 14.

Forced cut-off unit 105 cuts off secondary cell 101 from the outside of secondary cell pack 11 when the magnitude (absolute value) of the current value of secondary cell 101 becomes equal to or greater than a prescribed value. In the present exemplary embodiment, forced cut-off unit 105 is assumed to be a fuse that is provided in the wiring that connects secondary cell 101 and power-supply control unit 23 and that performs fusion cutting when the magnitude of the current value in this wiring equals or exceeds the prescribed value. The prescribed value is assumed to be within the cell halt range.

Figure 15:
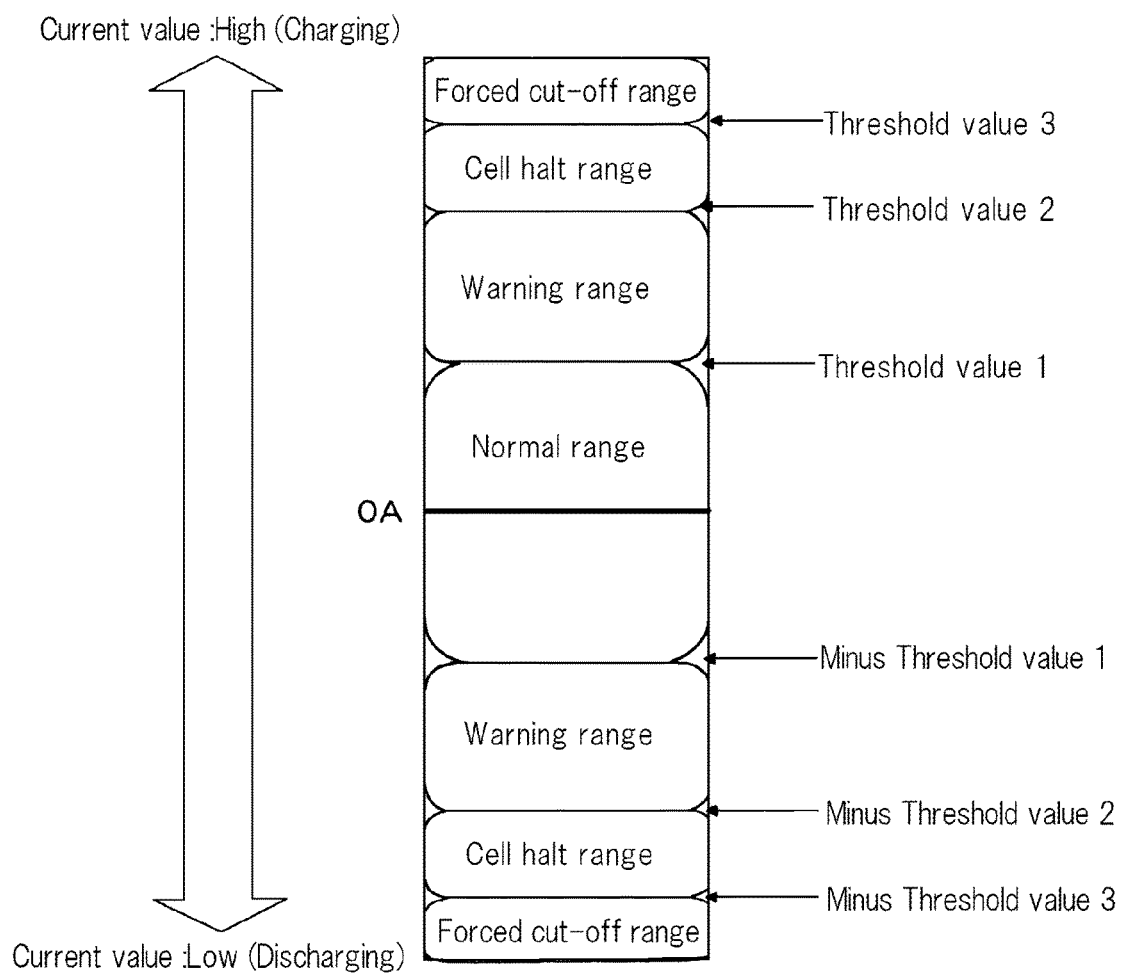
FIG. 15 is a view for describing the operation of the forced cut-off unit.

FIG. 15 is a view for describing the operation of forced cut-off unit 105.

As shown in FIG. 15, the forced cut-off range in which the electrical connection between secondary cell 101 and the outside of the secondary cell pack is cut by forced cut-off unit 105 is a range that is equal to or greater than threshold value 3 that corresponds to the prescribed value and a range equal to or less than minus threshold value 3 even within the cell halt range. As a result, when an extremely large current flows to secondary cell 101, secondary cell 101 can be immediately protected.

Thus, according to the present exemplary embodiment, secondary cell 101 can be protected even under circumstances in which the current value becomes extremely large and protection of secondary cell 101 will not be in time even when there is the cell protection function.

In each of the exemplary embodiments described hereinabove, the configurations shown in the figures are merely examples, and the present invention is not limited to these configurations.

For example, power storage unit 10 may be of a configuration that is equipped with only one secondary cell pack.

In addition, the same effects can obviously be exhibited even when the discharge current, the voltage, or the temperature is used as a state value other than the charging current.

EXPLANATION OF REFERENCE NUMBERS 10 power storage unit
20 system protection unit
11 secondary cell pack
21 EMS
22 cut-off gate
23 power-supply control unit
101 secondary cell
102 cell protection unit
103 cut-off gate
104 cell protection control unit
105 forced cut-off unit

What is claimed is:

1. A power storage system provided with a secondary cell pack and further including a system protection unit having a system protection function that cuts the electrical connection between said secondary cell pack and the outside of said power storage system; wherein:

said secondary cell pack comprises a secondary cell and a cell protection unit having a cell protection function that cuts the electrical connection between said secondary cell and the outside of said secondary cell pack;

said cell protection unit monitors a state value that indicates the state of said secondary cell and controls execution of said system protection function and said cell protection function based on said state value;

said cell protection unit executes said system protection function or said cell protection function based on said state value when said state value diverges from a normal range that has been determined in advance;

when said state value diverges from said normal range, said cell protection unit executes said system protection function or said cell protection function based on change of said state value when said state value is within a warning range that is adjacent to said normal range, and executes said cell protection function when said state value is within a cell halt range that is adjacent to said warning range and is not within said normal range; and when said state value is within said warning range, said cell protection unit predicts a halt postponement time that extends until protection of said secondary cell becomes necessary based on change of said state value, executes said system protection function when said halt postponement time is longer than a system halt delay time that was determined in advance, and executes said cell protection function when said halt postponement time is equal to or less than said system halt delay time.

2. The power storage system as set forth in claim 1, further comprising a forced cuts-off unit that cuts the electrical connection between said secondary cell and the outside of said secondary cell pack when the magnitude of the current value of said secondary cell equals or exceeds a prescribed value; wherein:

said state value includes the current value; and said prescribed value is contained within said warning range.

3. The power storage system as set forth in claim 1, wherein, when said halt postponement time is longer than said system halt delay time, said cell protection unit executes said system protection function after the passage of a deferment time derived by subtracting said system halt delay time from said halt postponement time.

4. The power storage system as set forth in claim 1, wherein, when said halt postponement time is equal to or less than said system halt delay time, said cell protection unit executes said cell protection function after the passage of a deferment time derived by subtracting a cell halt delay time that is shorter than said system halt delay time from said halt postponement time.

5. The power storage system as set forth in claim 3, wherein, when said state value returns to said normal range before the passage of said deferment time, said cell protection unit cancels the execution of said system protection function and said cell protection function.

6. The power storage system as set forth in claim 3, wherein, when said state value reaches said cell halt range before the passage of said deferment time, said cell protection unit executes said cell protection function.

7. The power storage system as set forth in claim 3, wherein said cell protection unit updates said halt postponement time based on change of said state value within said deferment time.

8. A cell protection method realized by a power storage system that is equipped with a secondary cell pack, comprising:

monitoring a state value that indicates the state of said secondary cell; and based on said state value, controlling the execution of a system protection function that cuts the electrical connection between said secondary cell pack and the outside of said power storage system and a cell protection function that cuts off a secondary cell provided in said secondary cell pack from the outside of said secondary cell pack;

wherein said system protection function or said cell protection function is executed based on said state value when said state value diverges from a normal range that has been determined in advance;

wherein when said state value diverges from said normal range said system protection function or said cell protection function is executed based on change of said state value when said state value is within a warning range that is adjacent to said normal range, and said cell protection function is executed when said state value is within a cell halt range that is adjacent to said warning range and is not within said normal range; and wherein when said state value is within said warning range, predicting a halt postponement time that extends until protection of said secondary cell becomes necessary based on change of said state value, and executing said system protection function when said halt postponement time is longer than a system halt delay time that was determined in advance, and executing said cell protection function when said halt postponement time is equal to or less than said system hail delay time.

* * * * *

UNITED STATES PATENT AND TRADEMARK OFFICE
CERTIFICATE OF CORRECTION

| | | |
|---|---|---|
| PATENT NO. | : 9,831,691 B2 | Page 1 of 1 |
| APPLICATION NO. | : 14/425218 | |
| DATED | : November 28, 2017 | |
| INVENTOR(S) | : Shin Suzuki and Ryou Shiozaki | |

It is certified that error appears in the above-identified patent and that said Letters Patent is hereby corrected as shown below:

In the Claims

Column 14, Line 50:
"hail" has been replaced with --halt--

Signed and Sealed this
Thirteenth Day of March, 2018

Andrei Iancu
*Director of the United States Patent and Trademark Office*